(12) United States Patent
Zur

(10) Patent No.: US 6,784,433 B2
(45) Date of Patent: Aug. 31, 2004

(54) HIGH RESOLUTION DETECTOR FOR X-RAY IMAGING

(75) Inventor: Albert Zur, Ganei Tikava (IL)

(73) Assignee: Edge Medical Devices Ltd., Raanana (IL)

( * ) Notice: Subject to any disclaimer, the term of this patent is extended or adjusted under 35 U.S.C. 154(b) by 215 days.

(21) Appl. No.: 10/139,317

(22) Filed: May 7, 2002

(65) Prior Publication Data

US 2003/0010923 A1 Jan. 16, 2003

Related U.S. Application Data

(63) Continuation-in-part of application No. 09/989,319, filed on Nov. 20, 2001, which is a continuation-in-part of application No. 09/806,187, filed on Jul. 16, 2001.

(51) Int. Cl.[7] .............................................. G01T 1/24
(52) U.S. Cl. ........................... 250/370.09; 250/370.08; 250/370.11
(58) Field of Search ....................... 250/370.09, 370.08, 250/370.11, 580, 370.01, 370.14, 208.1, 227.11, 239, 578.1, 311, 566, 448

(56) References Cited

U.S. PATENT DOCUMENTS

| | | | |
|---|---|---|---|
| 4,176,275 A | 11/1979 | Korn et al. | |
| 4,268,750 A | 5/1981 | Cowart | 250/315.1 |
| 4,663,774 A | 5/1987 | Saffer | |
| 5,084,911 A | 1/1992 | Sezan et al. | 378/96 |
| 5,313,066 A | 5/1994 | Lee et al. | 250/370.09 |
| 5,317,407 A | 5/1994 | Michon | 348/306 |
| 5,440,130 A | 8/1995 | Cox et al. | 250/370.09 |
| 5,508,507 A | 4/1996 | Nelson et al. | |
| 5,510,626 A | 4/1996 | Nelson et al. | 250/591 |
| 5,532,475 A | 7/1996 | Tonami et al. | 250/214 VT |
| 5,608,775 A | 3/1997 | Hassler et al. | 378/98.8 |
| 5,627,377 A | 5/1997 | Hamilton, Jr. et al. | |
| 5,648,660 A | 7/1997 | Lee et al. | 250/370.09 |
| 5,652,430 A | 7/1997 | Lee | 250/370.09 |
| 5,668,375 A | 9/1997 | Petrick et al. | 250/370.09 |
| 5,677,539 A | 10/1997 | Apotovsky et al. | 250/370.13 |
| 5,751,783 A | 5/1998 | Granfors et al. | 378/108 |
| 5,801,385 A | 9/1998 | Endo et al. | 250/370.11 |
| 5,809,107 A | 9/1998 | Schmitt | |
| 5,929,449 A * | 7/1999 | Huang | 250/370.09 |
| 6,172,369 B1 * | 1/2001 | Waechter et al. | 250/370.09 |
| 6,310,351 B1 | 10/2001 | Zur | 250/370.09 |
| 6,434,218 B1 | 8/2002 | Matsumoto | |
| 6,448,544 B1 * | 9/2002 | Stanton et al. | 250/208.1 |
| 6,573,525 B1 * | 6/2003 | Agano | 250/580 |
| 2002/0080055 A1 | 6/2002 | Zur et al. | |

FOREIGN PATENT DOCUMENTS

| | | | |
|---|---|---|---|
| EP | 0 574 690 A2 | 12/1993 | G01T/1/24 |
| WO | WO 01/08224 A1 | 2/2001 | H01L/27/146 |

OTHER PUBLICATIONS

English–language Abstract of JP 2000–139887, published May 23, 2000, 1 page.
Copy of European Search Report for Appln. No. EP 02 25 8122, Nov. 5, 2003 (date of completion of search), 3 pages.
U.S. patent application Ser. No. 09/989,319, Zur, filed Nov. 20, 2001.
English–language Abstract of JP 61–096867, published May 15, 1986, 1 page.
Copy of European Search Report from Appln. EP 99 30 0411 (Date of completion—Nov. 19, 2002), 2 pages.

* cited by examiner

*Primary Examiner*—Constantine Hannaher
*Assistant Examiner*—Otilia Gabor
(74) *Attorney, Agent, or Firm*—Sterne, Kessler, Goldstein & Fox P.L.L.C.

(57) ABSTRACT

An ionizing radiation image sensor and a method for ionizing radiation imaging, including an ionizing radiation sensitive element, a generally pixellated array of capacitors cooperating with the ionizing radiation sensitive element and a charge source, which is operative to electrically charge the pixellated array of capacitors through a gap.

23 Claims, 16 Drawing Sheets

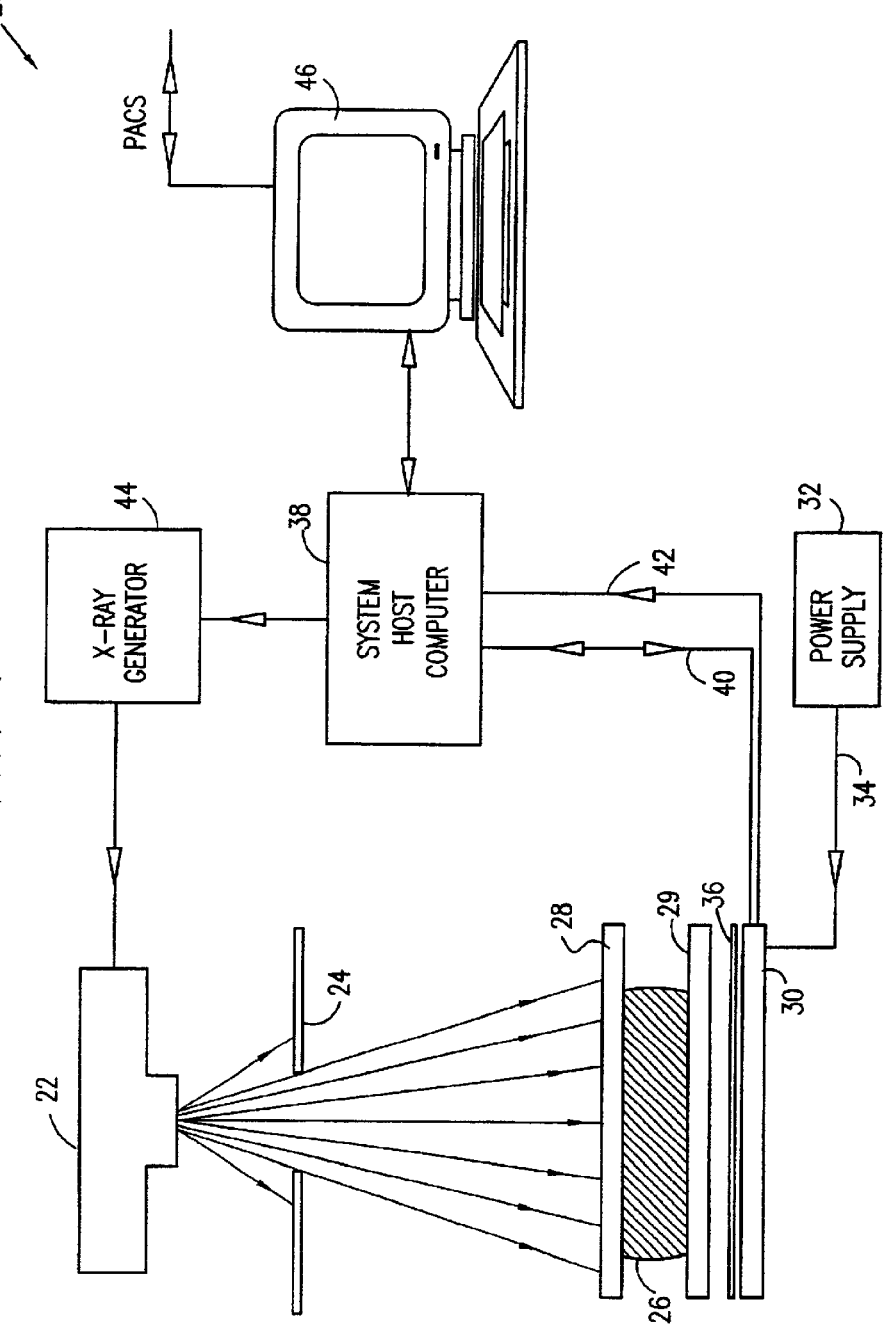

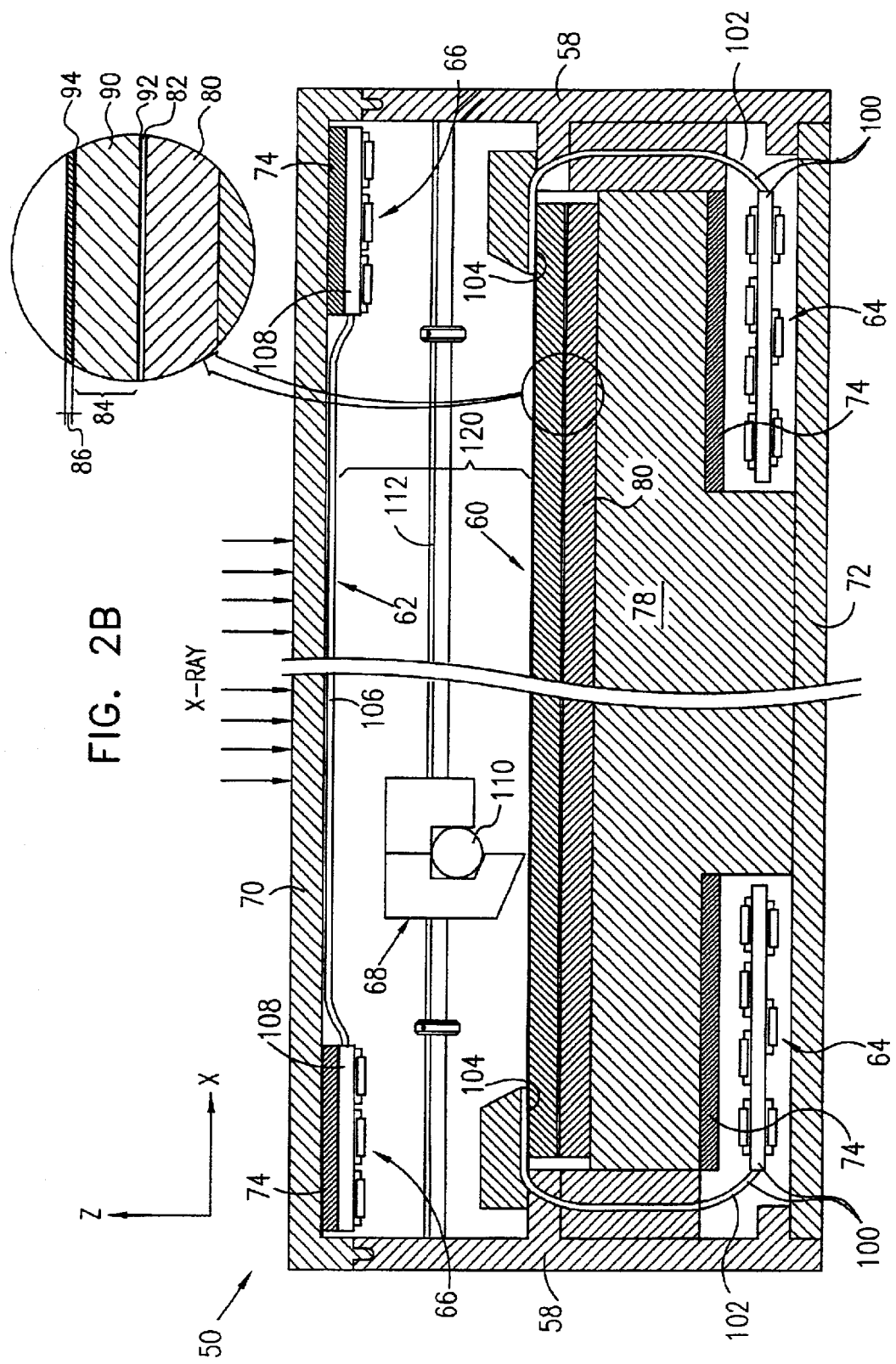

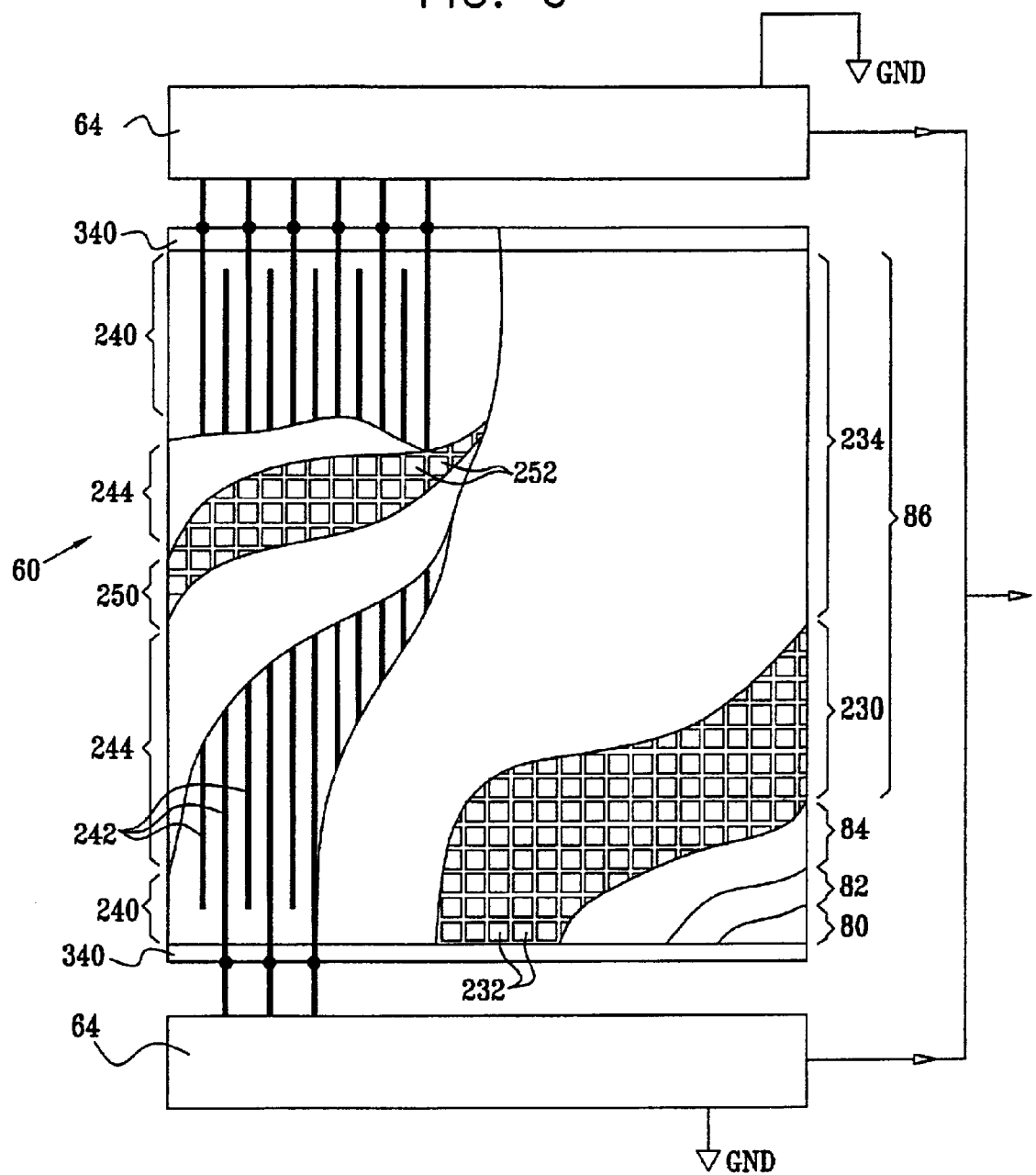

HIGH RESOLUTION DETECTOR FOR X-RAY IMAGING

Reference to Co-Pending Applications

This application is a continuation-in-part of U.S. patent application Ser. No. 09/989,319, filed Nov. 20, 2001, titled Hybrid Detector for X-ray Imaging which is a continuation-in-part of U.S. patent application Ser. No. 09/806,187 filed on Jul. 16, 2001.

FIELD OF THE INVENTION

The present invention relates to systems and methods in the field of ionizing radiation imaging and more particularly to a system and method for digital detection of X-ray images.

BACKGROUND OF THE INVENTION

There are described in the patent literature numerous systems and methods for the recording of X-ray images. Conventional X-ray imaging systems use an X-ray sensitive phosphor screen and a photosensitive film to form visible analog representations of modulated X-ray patterns. The phosphor screen absorbs X-ray radiation and emits visible light. The visible light exposes the photosensitive film to form a latent image of the X-ray pattern. The film is then chemically processed to transform the latent image into a visible analog representation of the X-ray pattern.

Recently, there have been proposed systems and methods for detection of static and or dynamic X-ray images. These digital X-ray systems and methods provide digital representations of X-ray images in which the X-ray image is recorded as readable electrical signals, thus obviating the need for films and screen in the imaging process. Digital X-ray systems typically rely on direct conversion of X-rays to charge carriers or alternatively indirect conversion in which X-rays are converted to light which is then converted to charge carriers.

Direct conversion approaches typically use an X-ray sensitive photoconductor such as amorphous selenium overlying a solid state element which comprises a solid state array having thin-film-transistors (TFT) or diodes coupled to an array of storage capacitors. An example of a direct conversion approach is provided by U.S. Pat. No. 5,313,066 to Lee et al., which describes an X-ray image capturing element comprising a panel having a layered structure including a conductive layer comprising a plurality of discrete accessible microplates and a plurality of access electrodes and electronic components built on the panel.

A further example of a direct conversion approach is U.S. Pat. No. 5,652,430 to Lee which describes a radiation detection panel made up of an assembly of radiation detector sensors arrayed in rows and columns where each sensor includes a radiation detector connected to a charge storage capacitor and a diode.

Indirect conversion approaches typically use a scintillating material such as columnar cesium iodide overlying a solid state active matrix array comprising photodiodes. The X-rays are converted to light by the scintillating material and the light is converted to charge by the photodiodes. An example of an indirect approach is provided by U.S. Pat. No. 5,668,375 to Petrick et al. which describes a large solid state X-ray detector having a plurality of cells arranged in rows and columns composed of photodiodes.

A further example of an indirect approach is provided by U.S. Pat. No. 5,801,385 to Endo et. al which describes an X-ray image detector having a plurality of photoelectric conversion elements on an insulating substrate.

Direct and indirect conversion based digital X-ray detectors use charge storage matrices to retain imaging information, which is then electronically addressed, with stored charge read out taking place subsequent to exposure. In dynamic imaging such as fluoroscopy, "real-time" images are simulated by repeatedly reading the integrated radiation values of the storage matrix to provide a sufficiently high number of frames per second, e.g. 30 frames per second. Image information, which is retained in the charge storage matrix, is not available until after the end of the X-ray pulse, since the detectors are operated in a storage mode. Thus, measurements made from the current generation of digital detectors are not real-time.

For medical diagnosis, it is desirable to use the minimum X-ray exposure dose that will provide an image having acceptable contrast and brightness.

The actual X-ray exposure dose for a specific X-ray examination may be selected using predetermined imaging exposure parameters and patient characteristics loaded from periodically updated lookup tables into a X-ray system console. Alternatively, the actual dose may be adjusted automatically using automatic exposure control devices, typically placed in front of the X-ray detector, to provide real-time control feedback to an X-ray source.

Automatic exposure control devices, which must operate in real-time, typically make use of a multi-field ion chamber or a segmented phototimer as described in U.S. Pat. No. 5,084,911. These devices sense radiation passing therethrough and provide a signal which terminates the X-ray exposure when a predetermined dose value, yielding a desired contrast level, has been reached.

Disadvantages of conventional exposure control devices include the fact that the real-time exposure signals are averaged over a fixed field area and do not directly correspond to the image information in a region of interest; the fact that devices located in front of the detector cause non-uniform attenuation of the X-rays and cause some of the radiation that would otherwise contribute to the signal at the detector to be lost; the fact that the devices are typically bulky and require external power sources; and the fact that the spectral sensitivity of the devices differs from that of the radiation image detector being used thus requiring corrections and calibrations for different X-ray tube voltage (kVp) values.

Efforts have been made to incorporate real-time exposure control into digital X-ray detectors, particularly those detectors based on the "indirect" conversion approach.

An example of apparatus for use in detecting real-time exposure information for an "indirect" scintillator based digital detector is described in U.S. Pat. No. 5,751,783 to Granfors et. al. This patent describes an exposure detection array of photodiodes positioned behind an imaging array of photodiodes. The exposure detection array, which is a separate component involving separate electronics, is used to detect light which passes through the imaging array in certain regions due to gaps between adjacent pixels caused by a relatively low pixel fill factor. Pixels are regionally grouped to provide regional density measurements.

Alternatively, for digital X-ray imaging, special methods have been proposed allowing digital detectors to sample the exposure prior to the imaging exposure using a two step method, thus simulating real-time exposure information. An example of a two-step exposure method is described in U.S. Pat. No. 5,608,775 to Hassler et al In that method exposure information for a digital detector is generated by first exposing the detector to a "calibrating" pulse in which an X-ray exposure of short duration produces an exposure in a solid state detector, which is then processed to calculate the X-ray transparency of the body being imaged in order to determine an optimum X-ray dose.

SUMMARY OF THE INVENTION

There is thus provided in accordance with a preferred embodiment of the present invention, an ionizing radiation imaging sensor for providing integrated radiation information based on a new high resolution digital X-ray detector suitable for ionizing radiation imaging, and in particular X-ray imaging for general radiography diagnostics.

There is thus provided in accordance with a preferred embodiment of the present invention, an ionizing radiation image sensor having an ionizing radiation sensitive element, a generally pixellated array of capacitors cooperating with the ionizing radiation sensitive element, and a charge source which is operative to electrically charge the pixellated array of capacitors through a gap.

Preferably, each capacitor of said generally pixellated array includes an electrode having at least one conducting plate which is at least partially exposed for charge injection thereto.

In further accordance with a preferred embodiment of the present invention, there is provided an ionizing radiation image sensor having an ionizing radiation conversion multilayer element which is operative to convert impinging ionizing radiation to electrical charge, an external charge source which is operative to emit electrical charge; and an array of storage capacitors disposed between the ionizing radiation conversion multilayer element and the external charge source, the storage capacitors being operative to sink charge to or source charge from the ionizing radiation conversion multilayer element and to sink charge to or source charge from the external charge source.

Preferably, the ionizing radiation image sensor is sensitive to X-ray. Moreover, the ionizing radiation conversion multilayer element preferably includes at least one layer which directly converts X-ray radiation to electrical charge.

Further in accordance with a preferred embodiment of the present invention, the one layer which directly converts X-ray radiation to electrical charge is formed from amorphous selenium doped with at least one of arsenic and chlorine.

In accordance with one preferred embodiment of the present invention, the radiation conversion multilayer element includes at least one layer which converts X-ray radiation to optical radiation. This layer may be formed from one of the following materials: cesium iodide doped with thallium and cesium iodide doped with sodium.

There is also provided in accordance with another preferred embodiment an ionizing radiation image readout device having an ionizing radiation sensitive element which is operative to convert impinging X-ray radiation to an electrical charge image; and a storage capacitor array operative to store the electrical charge image. The storage capacitor array has a matrix array of plate electrodes; a linear array of elongate electrodes. Preferably the storage capacitor array is addressed via the plate electrodes and a charge image readout is carried out via the elongate electrodes.

Preferably, the ionizing radiation image readout device includes at least one charge source which addresses the storage capacitor array by charge injection in a row-by-row manner. The charge injection preferably results in generally uniform charging of said matrix array of plate electrodes.

There is also provided in accordance with yet another preferred embodiment of the present invention, an ionizing radiation imager including a first array of storage capacitors which stores a charge pattern representing an ionizing radiation image at a first resolution; a second array of storage capacitors, capacitively coupled to the first array of storage capacitors, which stores a charge pattern representing the ionizing radiation image at a second resolution; integrated radiation data readout electronics connected to the first array of storage capacitors; and realtime radiation data readout electronics connected to the second array of storage capacitors.

Preferably, the integrated radiation data is taken at a generally high resolution and the real-time radiation data is taken at a generally lower image resolution. In accordance with one embodiment of the present invention, the integrated radiation data readout electronics provides data representing an X-ray image and the real-time radiation data provides feedback for automatic exposure control.

There is also provided in accordance with another preferred embodiment of the present invention a method for ionizing radiation imaging which includes providing an ionizing radiation sensitive element including an array of storage capacitors coupled thereto, charging the array of storage capacitors to a generally uniform voltage level using a non-contact proximity charge source; exposing the ionizing radiation sensitive element to impinging ionizing radiation causing imagewise discharge of the charged array of storage capacitors thus creating an electrical charge pattern therein corresponding to an ionizing radiation image; and charging said the of storage capacitors to a generally uniform voltage level using a non-contact proximity charge source which causes readout of the electrical charge pattern.

In accordance to one embodiment of the present invention the charging includes charge injection to each capacitor of said array via at least one conducting plate which is at least partially exposed for charge injection thereto.

There is also provided a method for ionizing radiation imaging including providing an ionizing radiation conversion multilayer element which converts impinging ionizing radiation to electrical charge; causing an external charge source to emit electrical charge; and causing an array of storage capacitors disposed between the ionizing radiation conversion multilayer element and the external charge source to sink charge to or source charge from the ionizing radiation conversion multilayer element and to sink charge to or source charge from the external charge source.

In accordance with one embodiment of the present invention, the ionizing radiation conversion multilayer element is sensitive to X-ray. The ionizing radiation conversion multilayer element may typically include at least one layer which directly converts X-ray radiation to electrical charge.

In accordance with an alternative embodiment of the present invention, the ionizing radiation conversion multilayer element includes at least one layer which converts X-ray radiation to optical radiation.

There is also provided in further accordance with an embodiment of the present invention, an ionizing radiation image readout method which includes causing an ionizing radiation sensitive element to convert impinging X-ray radiation to an electrical charge image; and storing the electrical charge image on a storage capacitor array including a matrix array of plate electrodes and a linear array of elongate electrodes; addressing the storage capacitor array via the plate electrodes; and reading out the electrical charge image via the elongate electrodes.

There is also provided in yet further accordance with an embodiment of the present invention, a method for ionizing radiation imaging including the causing of a first array of storage capacitors to store a charge pattern representing an ionizing radiation image at a first resolution; the causing of a second array of storage capacitors, capacitively coupled to the first array of storage capacitors, to store a charge pattern representing the ionizing radiation image at a second resolution; reading out real-time radiation image data from the second array of storage capacitors; and reading out integrated radiation image data from said first array of storage capacitors.

This method may also include the step of effecting real-time exposure control employing said real-time radiation image data.

BRIEF DESCRIPTION OF THE DRAWINGS

The present invention will be understood and appreciated more fully from the following detailed description, taken in conjunction with the drawings in which:

FIG. 1 illustrates a digital X-ray system incorporating an enhanced image detection module in accordance with a preferred embodiment of the present invention.

FIGS. 2A and 2B are respective simplified pictorial and sectional illustrations of an image detection module forming part of the system of FIG. 1, FIG. 2B is taken along lines 2B—2B of FIG. 2A.

FIG. 6 is a partially cutaway top view illustration of the X-ray sensor which forms part of the image detection module of FIGS. 1, 2A–2B.

DETAILED DESCRIPTION OF PREFERRED EMBODIMENTS

Figure 2A:
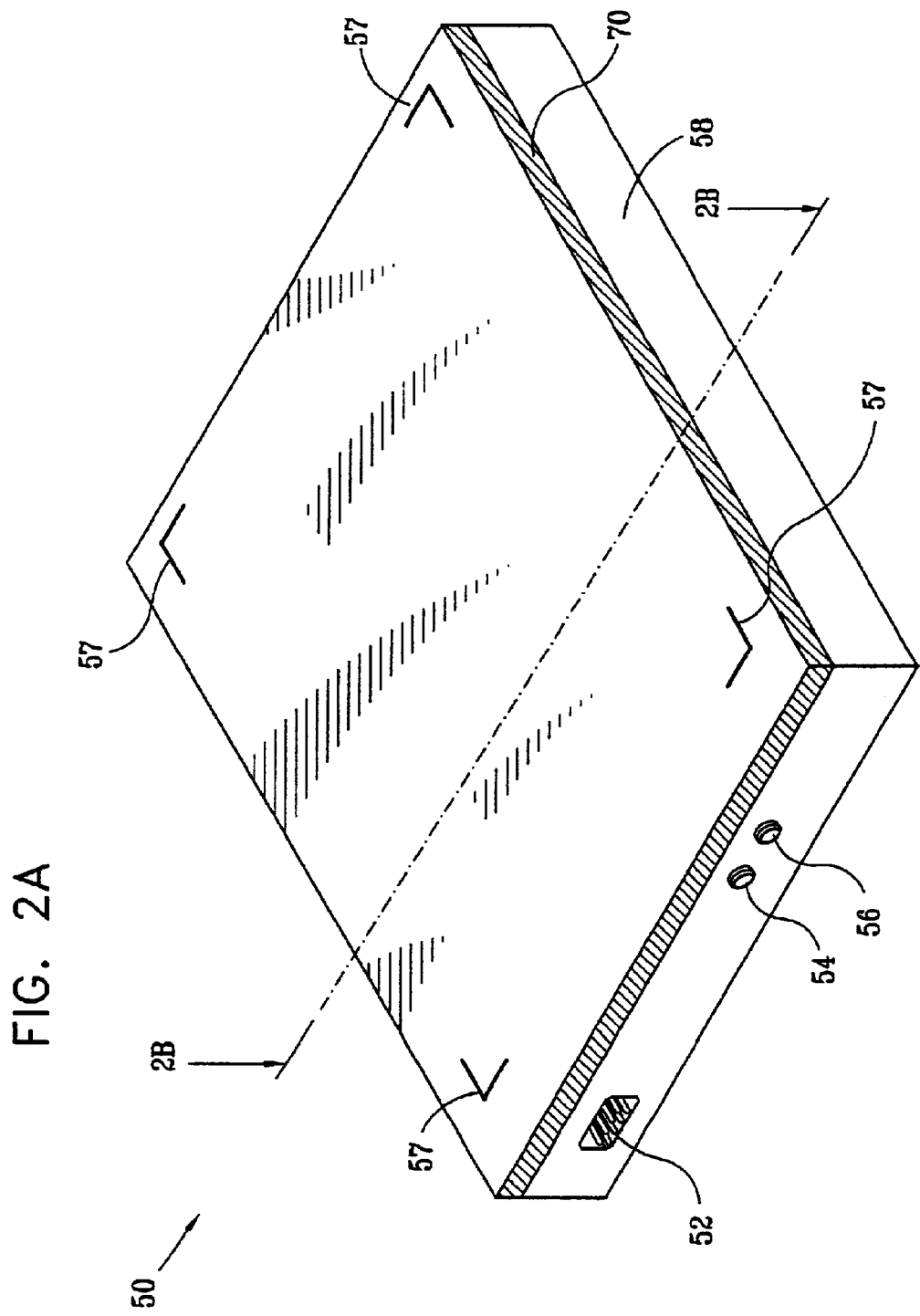

Reference is now made to FIG. 1 which illustrates a digital X-ray system in accordance with a preferred embodiment of the present invention which is particularly suited for high-resolution imaging applications such as mammography.

FIG. 1 shows a digital X-ray imaging system 20, which includes an X-ray source 22 from which an X-ray beam is emitted. A collimator 24 preferably shapes the emitted X-ray beam. Preferably, when the digital X-ray imaging system 20 is used for mammography, a breast to be imaged 26 is compressed using a compression paddle 28 and held firmly in place on an X-ray permeable platform 29. The X-ray beam impinges upon the breast 26. The portion of the X-ray beam which is transmitted through the breast 26 of the patient impinges upon a high-resolution image detection module 30, which is preferably a flat panel digital X-ray detector constructed and operative in accordance with a preferred embodiment of the present invention, as described hereinbelow with reference to FIGS. 2A–2B. The image detection module 30 is preferably driven by an external power supply 32 which provides power via a power supply cable 34. The X-ray imaging system may include a radiation anti scatter grid 36 as known in the art.

Typically, the collimator 24 includes movable lead shutters which are arranged to restrict and shape the X-ray beam to define a desired irradiation field area which is typically rectangular. By restricting the irradiated field, the overall dose of the X-ray to the patient may be reduced and X-ray image contrast is enhanced due to reduced scattering of primary X-ray radiation.

Preferably, the operation of the image detection module 30 is controlled by a system host computer 38, typically including a controller and data processor. A communications link 40, which may use a standard communications protocol such as RS232 or USB, preferably connects the image detection module 30 to the system host computer 38 and is used for communication of control information. High speed transfer of imaging data from image detection module 30 to the data processor of system host computer 38 is preferably handled by a high speed data link 42 which may employ an electrical or fiber optic link. Alternately, the high speed data link 42 and or the communications link 40 may be wireless.

The controller of system host computer 34 preferably controls an X-ray generator 44 to set the exposure parameters of X-ray source 22 such as tube voltage (kVp), tube current (milliamperes) and the maximum expected duration of X-ray exposure. These parameters are typically set in accordance with the requirements of a specific patient examination under operator control. In accordance with a preferred embodiment of the present invention, the actual duration of X-ray exposure is determined automatically as described hereinbelow.

In accordance with an alternative embodiment of the present invention, the exposure parameters of X-ray generator 44 may be input manually to a separate generator console (not shown).

Digital X-ray system 20 preferably also includes a terminal 46 which serves as an image display station and preferably also includes a user interface for the system operator.

It is appreciated that larger versions of high-resolution image detection module 30 may be used with other types of X-ray systems for diagnostic imaging not limited to mammography.

In the non-limiting example described herein, a mammography system such as those sold by General Electric Medical Systems Corporation or Siemens Medical Systems, Inc. may form part of digital X-ray imaging system 20 and provide most of the system elements other than the high resolution image detection module 30, which typically operates in the following manner:

Patient data is input and exposure parameters are selected by the technologist at terminal 46 and are forwarded to the X-ray generator 44. Prior to exposure the technologist positions the breast 26 of a patient using compression paddle 28 on X-ray permeable platform 29. The technologist then preferably adjusts the X-ray source 22 and collimator 24 to spatially define the irradiation field. Alternatively, operation of the collimator 24 may be automated, with electromechanical sensing devices being used to position X-ray source 22 and/or lead shutters of the collimator 24.

After patient positioning, an X-ray exposure is initiated by the technologist at terminal 46 or by using a dedicated manual prepare and expose switch. During patient exposure, the X-ray beam impinges on the patient and is imagewise modulated as part some of the X-rays pass through the patient breast and some of the X-rays are absorbed therein. Thus spatially modulated X-ray radiation which contains information relating to the patient's breast anatomy impinges on the image detection module 30. In accordance with a preferred embodiment of the present invention, exposure data is generated in real-time by image detection module 30 and transferred in real-time to the data processor of system host computer 38 through data link 42.

It is appreciated that the same data link 42 may be used for transfer of both integrated radiation data and real-time exposure data as described hereinbelow. The real-time exposure data is used to provide enhanced real-time dose control obviating the need for an external automatic exposure control device as in prior art methodologies.

Moreover, the present invention provides a large number of field exposure sensors. A suitable selection of such sensors may be employed so as to provide flexibility in terms of aperture size and location. This contrasts with the prior art which provides a small number of density sensors.

Preferably, upon completion of patient exposure, raw image data, comprising integrated radiation values representing a digital image, is read out and transferred from image detection module 30 to the data processor of system host computer 38 via data link 42. The digital image is preferably displayed on monitor 46 and then may be stored in or retrieved from a Picture Archiving and Communications System (PACS) using standard network communication. Preferably the Digital Imaging and Communications in Medicine (DICOM) protocol as known in the art is employed. Alternatively or additionally, digital images may be exported to a hard copy output device, such as a laser imager, to provide an image on film or any other suitable substrate.

Reference is now made to FIGS. 2A and 2B which illustrate an image detection module 50 which may serve as image detection module 30 of FIG. 1 in accordance with a preferred embodiment of the present invention. Image detection module 50 typically includes a power connector 52, a control communication connector 54 and a high speed data output connector 56 which are connected to power supply cable 34 (FIG. 1), communications link 40 (FIG. 1), and high speed data link 42 (FIG. 1) respectively. Preferably, the imaging area of image detection module 50, indicated in FIG. 2A by reference markings 57, is at least 24 cm×30 cm. Using an imaging area of this size allows image detection module 50 to be used for most mammography examinations.

As shown in FIG. 2B, which shows a cross-section of image detection module 50 taken along line 2B—2B (FIG. 2A), image detection module 50 preferably includes an outer casing 58 enclosing an X-ray sensor 60 and an apparent surface voltage (ASV) sensor 62 which are respectively associated with integrated radiation data readout electronics 64 and with real-time exposure data readout electronics 66. An elongate scanner 68, control electronics (not shown) and motion drivers (not shown) are also enclosed by outer casing 58. It is appreciated that integrated radiation data readout electronics 64 provide signals associated with time-integrated radiation impinging upon X-ray sensor 60.

Casing 58, which is preferably EMI-RFI protected and light shielding, is preferably formed of a lightweight electrically conducting material such as aluminum and may include a removable upper cover 70 and a removable lower cover 72. Upper cover 70 is X-ray permeable. X-ray shielding 74, typically highly X-ray absorbent material, such as lead or tungsten, preferably overlies and shields detector electronics within casing 58. An internal base 78, which serves as a base upon which X-ray sensor 60 is removably mounted, is preferably located in casing 58 and may be formed as an integral part thereof.

X-ray sensor 60 preferably comprises a layered stack including, from bottom to top, a support substrate 80, a back electrode 82 overlying the support substrate 80, a photoelectric conversion multilayer 84 overlying back electrode 82 and a multilayer capacitor array 86 overlying the photoelectric conversion multilayer 84.

Support substrate 80 provides mechanical support and dimensional stability for X-ray sensor 60 and may serve as a base upon which overlying layers are formed. Preferably, support substrate 80 is an electrically insulating panel, typically 1 mm–5 mm thick, having a flat, relatively flawless top surface. Examples of suitable materials for support substrate 80 are Corning glass 7059 and 1737, Schott Glass AF-45, flat borosilicate glass and soda lime glass which may have a silicon dioxide top coating. In accordance with alternative embodiments of the present invention, support substrate 80 may be an insulative rigid material, such as alumina, or a metallic substrate having a relatively thick dielectric coating on its top surface.

In accordance with a preferred embodiment of the present invention, back electrode 82 is a generally continuous conductive film which is deposited on a top surface of support substrate 80.

The conductive film is preferably a thin coating such as indium tin oxide (ITO), aluminum, gold, platinum, chrome, or a combination thereof or any suitable conducting material, which is typically deposited on support substrate 80 using conventional vacuum deposition techniques such as sputtering and thermal evaporation to provide a uniform conducting layer which is typically 500–10,000 angstroms thick.

Preferably, the back electrode 82, is etched and configured to include a connection terminal (not shown) through which high voltage may be applied thereto. The back electrode 82 preferably only extends to a predefined distance from the edges of the support substrate 80 thus defining a non-conducting perimeter for support substrate 80. Photoelectric conversion multilayer 84 preferably encapsulates the back electrode 82, thereby preventing direct exposure thereof to air and thus preventing electrical breakdowns when high voltage is applied to back electrode 82.

Photoelectric conversion multilayer 84 preferably comprises a relatively thick photoelectric conversion layer 90, a first charge buffer layer 92, and a second charge buffer layer 94. Alternatively, photoelectric conversion multilayer 84 may include one or no charge buffer layers.

Photoelectric conversion layer 90 preferably exhibits properties which make it suitable to serve as an X-ray imaging material. Following electrical sensitization of photoelectric conversion layer 90 and exposure to incident radiation, efficient conversion of X-ray photons to charge carriers occurs therein. Photogenerated free electron hole pairs preferably have relatively high charge carrier mobility and a relatively long lifetime such that the mean free path of the charge carriers is greater than the thickness of photoelectric conversion layer 90. In addition, photoelectric conversion layer 90 preferably exhibits generally relatively high dark electrical resistivity yielding a relatively low dark current, allowing an electric field to be maintained thereacross during X-ray imaging. Furthermore, photoelectric conversion layer 90 is preferably characterized in that the density of charge carrier trap sites therein is low.

Photoelectric conversion layer 90 may be formed of amorphous selenium, selenium alloys, lead iodide, lead oxide, thallium bromide, cadmium zinc telluride, cadmium sulfide, mercury iodide and combinations thereof or any other suitable material that exhibits photoelectric X-ray sensitivity in the radiation spectrum of interest. Typically for mammography, the X-ray photon energy spectrum ranges from 18 to 30 keV. For general radiography, the X-ray photon energy spectrum typically ranges from 40 to 140 keV.

It is appreciated that, due to its high dark resistivity and its relatively simple deposition process, amorphous selenium, which may be doped with arsenic and chlorine, is generally considered the material of choice for photoelectric conversion layer 90. However, it is a particular feature of the present invention that materials having a relatively high dark current can be tolerated by factoring out a DC component from the integrated radiation data as described hereinbelow.

Preferably, the thickness of photoelectric conversion layer 90 is sufficient to allow absorption of at least 50% of the incident X-ray radiation. For example, when using amorphous selenium or doped amorphous selenium alloys, the layer thickness required to achieve at least 50% absorption ranges from approximately 30 microns (at 18 keV) to 600 microns (at 150 keV). Thus, in accordance with the specific medical imaging application being used, the thickness of photoelectric conversion layer 90 typically ranges from 100 microns (mammography) to over 1000 microns (general radiography) when amorphous selenium is employed.

In accordance with one preferred embodiment of the present invention, the first charge buffer layer 92, typically of thickness in the submicron up to several micron range, is disposed at the interface between the photoelectric conversion layer 90 and back electrode 82.

Preferably, first charge buffer layer 92 has unipolar charge blocking characteristics. First charge buffer layer 92 reduces dark current by preventing charges of one polarity from being injected from back electrode 82 into electrically sensitized photoelectric conversion layer 90, while allowing charges of the opposing polarity created by photogeneration to be swept from photoelectric conversion layer 90 and collected at back electrode 82 during radiation exposure.

When photoelectric conversion layer 90 is amorphous selenium, first charge buffer layer 92 may be formed of amorphous arsenic triselenide (a-$As_2Se_3$) by vacuum deposition to provide a unipolar negative charge blocking layer.

Preferably, second charge buffer layer 94 has unipolar charge blocking characteristics and is disposed at the interface between photoelectric conversion layer 90 and the multilayer capacitor array 86. Second charge buffer layer 94, which is typically of thickness in the submicron up to several micron range, reduces dark current by preventing charges of one polarity from being injected from multilayer capacitor array 86 into electrically sensitized photoelectric conversion layer 90, while allowing charges of the opposing polarity to be swept from photoelectric conversion layer 90 and collected at multilayer capacitor array 86 during radiation exposure.

When second charge buffer layer 94 is a unipolar charge blocking layer, it blocks charges having a polarity opposite to the polarity of the charges that are blocked by first charge buffer layer 92.

When photoelectric conversion layer 90 is amorphous selenium, second charge buffer layer 94 is preferably formed by vacuum deposition of an alkali doped selenium layer to provide a unipolar positive charge blocking layer.

Alternatively, first charge buffer layer 92 and or second charge buffer layer 94 may be dielectric coatings, such as silicon dioxide or silicon nitride, of submicron thickness exhibiting bipolar charge blocking characteristics.

In accordance with an alternate embodiment of the present invention, a passivation layer (not shown) overlies and chemically passivates photoelectric conversion multilayer 84 during the formation of the multilayer capacitor array 86. Examples of a suitable material for the passivation layer (not shown) are dielectric polymers such as poly-para-xylylenes which may be applied as a conformal coating in a room-temperature by vacuum deposition as known in the art. Preferably, the thickness of passivation layer (not shown) is in the submicron up to several micron range.

Multilayer capacitor array 86, which is described hereinbelow with reference to FIGS. 4A–5B, is preferably a multi-layer structure including patterned conductive and dielectric layers defining a generally pixellated matrix array of storage capacitors and connection regions overlying photoelectric conversion multilayer 84. Each capacitor of the multilayer capacitor array 86 stores charge data corresponding to a basic imaging element (pixel) of the final image.

Integrated radiation data readout electronics 64 and real-time exposure data readout electronics 66 are preferably located in X-ray shielded regions and thus are protected from direct radiation exposure.

Integrated radiation data readout electronics 64 is preferably mounted on at least one printed circuit board 100. Printed circuit boards 100 each preferably include a bendable intermediate portion 102 and an interconnect portion 104. Interconnect portion 104 provides permanent or removable connections with a peripheral, fan-out connection regions (not shown) of multilayer capacitor array 86. Removable connections, which enable integrated radiation data readout electronics 64 or alternatively X-ray sensor 60 to be removed for servicing or replacement, may be provided by high density elastomeric zebra connectors or any other suitable connectors. Permanent connections may employ anisotropic electrically conducting adhesive films as known in the art.

ASV sensor 62, which provides a real-time indication of the radiation exposure at X-ray sensor 60, is preferably mounted on an inner surface of upper cover 70 of image detection module 50. ASV sensor 62 is operated and constructed in accordance with a preferred embodiment of the present invention and may be as described hereinbelow with particular reference to FIG. 7.

In accordance with a preferred embodiment of the present invention, ASV sensor 62, which overlies and faces X-ray sensor 60, is a multi-layer printed circuit board PCB having a bendable portion 106 and at least one rigid portion 108. Preferably, the bendable portion 106, which includes very thin X-ray permeable layers of polyimide and conductive material, is mounted beneath X-ray permeable upper cover 70. The rigid portion 108 of ASV sensor 64, on which real-time exposure data readout electronics 66 is preferably assembled, is mounted beneath X-ray shielding 74.

According to an alternative embodiment of the present invention, separate printed circuit boards containing real-time exposure data readout electronics 66 may be connected to the bendable portion 106 of ASV sensor 64 using removable or permanent connections. Permanent connections may employ anisotropic electrically conducting adhesive films as known in the art.

Elongate scanner 68, which preferably includes an elongate charge injector 110 is preferably a scanner constructed and operative in accordance with the present invention as described hereinbelow with reference to FIG. 8. Typically, elongate scanner 68 is capable of sweeping back and forth over X-ray sensor 60 using a conventional electromechanical driver (not shown) to provide linear motion thereof along conventional linear guides 112.

A space 120, which is preferably occupied by a suitable gas such as air, preferably separates ASV sensor 62 from multilayer capacitor array 86 of X-ray sensor 60.

Elongate scanner 68 sweeps over X-ray sensor 60 in the x-direction in the space 120 separating ASV sensor 62 from X-ray sensor 60. Sweeps of elongate scanner 68 may be operative to electrically sensitize X-ray sensor 60 and/or to read out a charge pattern corresponding to integrated X-ray radiation which impinged upon X-ray sensor 60 as described hereinbelow with particular reference to FIG. 10C.

In the z-direction, elongate scanner 68 is preferably separated from the top surface of X-ray sensor 60 at a defined distance which is typically selected to leave 0.1 mm–0.3 mm between a wedge 424 (FIG. 8) of elongate scanner 68 and the top surface of X-ray sensor 60. It is appreciated that, within this range, maintaining a precise distance between wedge 424 (FIG. 8) of elongate scanner 68 and top surface of X-ray sensor 60 is not critical to the operation of image detection module 50.

In order to achieve a fairly compact and generally flat image detection module 50, the z-dimension of elongate scanner 68 is preferably fairly small, typically 5–10 mm, with the space 120 sufficient to allow clearance of the elongate scanner 68 during sweeping scans.

Figure 3:
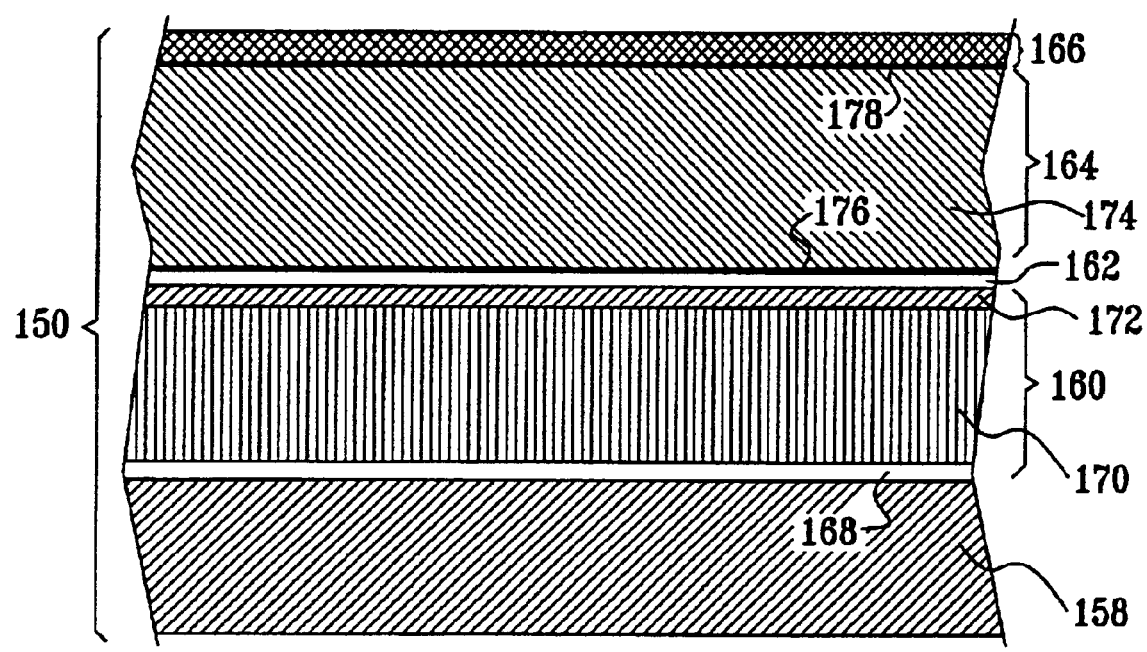
FIG. 3 is a cross-sectional illustration of an X-ray sensor of the image detection module of FIGS. 1, 2A–2B in accordance with an alternative embodiment of the present invention.

Reference is now made to FIG. 3 which is a cross-sectional illustration of an X-ray sensor 150. In accordance with an alternative embodiment of the present invention, X-ray sensor 150 may serve as X-ray sensor 60 in the embodiment of FIG. 2B.

X-ray sensor 150 is characterized by the use of optical coupling of distinct X-ray absorbing materials, to provide increased X-ray absorption during X-ray imaging. Increasing X-ray absorption yields improved detective quantum efficiency (DQE) when compared with X-ray sensor 60 (FIG. 2B), particularly for medical applications other than mammography which involve exposures with harder X-ray radiation composed of shorter wavelengths. It is appreciated that improved DQE may result in reduced patient imaging radiation doses.

X-ray sensor 150 preferably comprises a layered stack including, from bottom to top, a support substrate 158, a scintillator multilayer 160, a back electrode 162 overlying the scintillator multilayer 160, a photoelectric conversion multilayer 164 overlying back electrode 162 and a multilayer capacitor array 166 overlying the photoelectric conversion multilayer 164.

Support substrate 158 provides mechanical support and dimensional stability for X-ray sensor 150 and may serve as a base upon which overlying layers are formed. Preferably, support substrate 150 is an electrically insulating panel, typically 1 mm–5 mm thick, having a flat, relatively flawless top surface. Examples of suitable materials for support substrate 158 are Corning glass 7059 and 1737 and Schott Glass AF-45, flat borosilicate glass and soda lime glass.

Scintillator multilayer 160, which overlies support substrate 158, preferably includes an optical radiation absorbing or reflecting layer 168, a scintillator 170 and a protective overlayer 172.

Optical radiation absorbing or reflecting layer 168 is preferably either generally totally absorbing or generally totally reflecting. It is appreciated that support substrate 158 may be generally totally absorbing or reflecting thus obviating the need for an additional optical radiation absorbing or reflecting layer 168. An example of a support substrate 158 that may serve as a generally totally absorbing layer is amorphous carbon. An example of a support substrate 158 that may serve as a generally totally reflecting layer is alumina. Typically, a generally reflecting layer provides increased light output of the scintillator 170 at a lower spatial resolution, while a generally absorbing layer yields less light output but maintains a higher spatial resolution.

Scintillator 170 is a material which absorbs X-ray radiation and converts it to optical radiation. An example of a suitable material for scintillator 170 is doped cesium iodide. Typically, doped cesium iodide is deposited by evaporation to form a highly-packed, columnar structure of needles which are several microns in diameter and several hundred microns long (the thickness of scintillator 170). Use of cesium iodide as a scintillator and deposition thereof in needle form is commonly known in the art.

A particular advantage of the needle-like structure is the improved spatial resolution of the optical coupling between scintillator multilayer 170 and photoelectric conversion multilayer 164. Thus, optical radiation emitted as a result of scintillation is efficiently guided into photoelectric conversion multilayer 164 thereby reducing scattering and improving total conversion efficiency from x-ray radiation to charge carriers.

Protective overlayer 172, which preferably overlies and passivates scintillator 170, insulates the scintillator 170 from humidity and other external factors, such as chemicals. Protective overlayer 172 is typically a poly-para-xylylenes layer. In accordance with an alternative embodiment of the present invention, protective overlayer 172 may incorporate a benzocyclobutene layer or a polyimide layer which is preferably spin-coated and cured to provide planarization as known in the art.

In accordance with a preferred embodiment of the present invention, back electrode 162 is a generally continuous electrically conductive and optically transparent film, deposited over protective overlayer 172 of scintillator multilayer 160.

The conductive film is preferably formed from a conducting material such as indium tin oxide (ITO), deposited using conventional vacuum deposition techniques such as sputtering, to provide a uniform optically transparent conducting layer.

Preferably, the back electrode 162, is etched and configured to include a connection terminal (not shown) through which high voltage may be applied thereto. The back electrode 162 preferably only extends to a predefined distance from the edges of scintillator multilayer 160 thus defining a non-conducting perimeter for scintillator multilayer 160. Photoelectric conversion multilayer 164 preferably encapsulates the back electrode 162, thereby preventing direct exposure thereof to air and thus preventing electrical breakdowns when high voltage is applied to back electrode 162.

Photoelectric conversion multilayer 164 preferably comprises a relatively thick photoelectric conversion layer 174, a first transparent charge buffer layer 176, and a second charge buffer layer 178. Alternatively, photoelectric conversion multilayer 164 may include one or no charge buffer layers.

In accordance with the present embodiment, photoelectric conversion layer 174 and second charge buffer layer 178 are based on amorphous doped selenium and are preferably constructed and operated as described hereinabove with reference to corresponding layers of photoelectric conversion multilayer 84 (FIG. 2B).

Multilayer capacitor array 166 is preferably a multi-layer structure including patterned conductive and dielectric layers defining a generally pixellated matrix array of storage capacitors as described hereinbelow with reference to FIGS. 4A–4B or alternatively with reference to FIGS. 5A–5B.

During X-ray imaging, X-ray radiation is partially absorbed by electrically sensitized photoelectric conversion multilayer 164 and partially absorbed by scintillator 170. The X-ray radiation that is partially absorbed by electrically sensitized photoelectric conversion multilayer 164 is directly converted to charge carriers with a first conversion gain. The X-ray radiation which is partially absorbed by scintillator 170 generates optical radiation that is directed into photoelectric conversion multilayer 164 and absorbed thereby causing the generation of charge carriers therein at a second conversion gain.

It is a particular feature of the present invention that the peak wavelength emission of the scintillator 170 is well absorbed by the photoelectric conversion layer 174. For example, when photoelectric conversion layer 174 is a doped amorphous selenium, scintillator 170 is preferably cesium iodide doped with sodium which has a peak emission wavelength at approximately 420 nanometers.

In addition to its absorption characteristics, X-ray imaging sensor 150 is designed and configured to provide a certain level of gain matching between the first conversion gain and the second conversion gain. Preferably, the difference in gains between the two conversion paths is less than forty percent.

The charge carriers, generated in photoelectric conversion multilayer 164 either directly as a result of X-ray to charge conversion or indirectly as a result of X-ray to optical radiation conversion and the optical radiation to charge conversion, are electrically extracted and collected and retained at multilayer capacitor array 166. It is appreciated that using a highly-absorbent scintillator may provide improved imaging performance through enhancement of the Detective Quantum Efficiency (DQE) for harder radiation while maintaining the system Modulation Transfer Function (MTF) at an acceptable level.

The spatial pattern of the charges retained at multilayer capacitor array 166, which reflects the X-ray image, is typically read out line-by-line as described hereinbelow with particular reference to FIG. 10C, to provide a digital representation of an X-ray image.

Figure 4A:
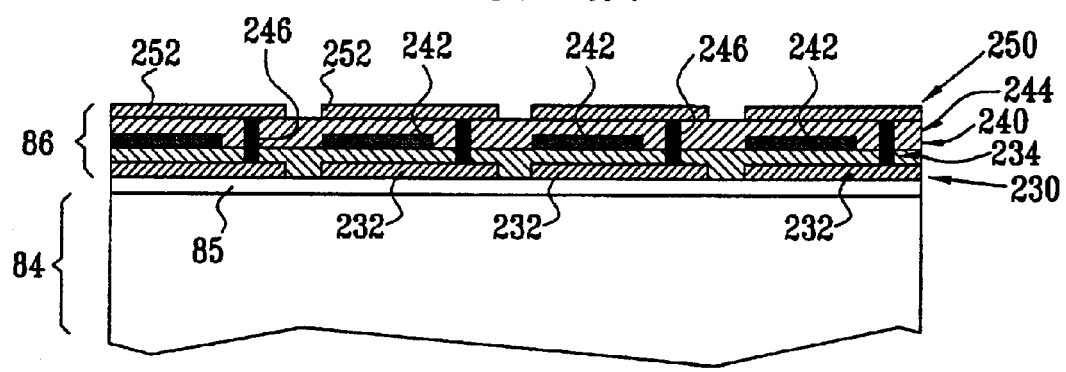
FIGS. 4A and 4B are further illustrations of parts of the sectional illustration of FIG. 2B in accordance with a preferred embodiment of the present invention
Figure 4B:
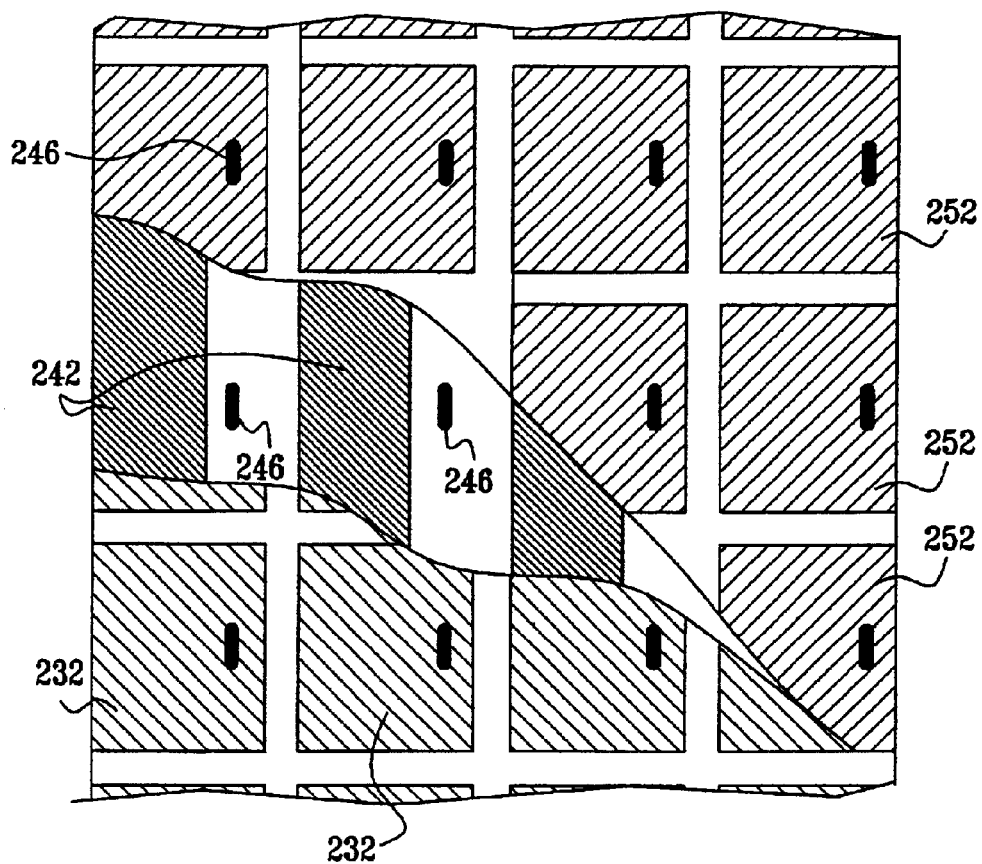

Reference is now made to FIGS. 4A and 4B which are respectively cross-section and partially cut away top view schematic illustrations of multi-layer capacitor array 86 (FIG. 2B), constructed and operative in accordance with a preferred embodiment of the present invention. It is appreciated that multi-layer capacitor array 86 may serve as multi-layer capacitor array 166 (FIG. 3).

Multi-layer capacitor array 86 includes, from bottom to top, a first conductive layer 230 which is patterned to produce a two-dimensional matrix array of embedded microplates 232; an overlying first dielectric layer 234; an overlying second conductive layer 240 which is patterned to produce a linear array of parallel elongate conductive strips 242; an overlying second dielectric layer 244 which is preferably perforated to produce an array of perforations 246. Preferably, perforations 246 extend through first dielectric layer 234 and expose embedded microplates 232. In addition, multilayer capacitor array 86 includes a third conductive layer 250, which is patterned to produce a two-dimensional matrix array of exposed microplates 252, overlying second dielectric layer 244.

In accordance with a preferred embodiment of the present invention, multilayer capacitor array 86 is formed, layer by layer, over photoelectric conversion multilayer 84 or over an optional passivation layer 85 overlying the photoelectric conversion multilayer 84. Alternatively, multilayer capacitor array 86 may be formed in its entirety as a multilayer element which is then laminated onto photoelectric conversion multilayer 84.

It is appreciated that when multilayer capacitor array 86 is formed, layer by layer, over underlying layers of X-ray sensor 60, the production process is selected in accordance with the parameters of the underlying layers in order not to cause damage thereto. For example, when photoelectric conversion multilayer is amorphous selenium, the layer forming steps are preferably carried out at relatively low temperature, i.e. below 40 degrees Celsius, in order to avoid temperature-related crystallization of the amorphous selenium material.

First conductive layer 230 is deposited as a uniform layer, preferably a metal, such as chrome, copper, gold, platinum, a combination thereof or alternatively, any other suitable conducting material. Preferably, first conductive layer 230 is deposited using a vacuum deposition process to create a continuous layer having a uniform thickness in the range between 500 to 10,000 angstroms.

After deposition thereof as a uniform layer, first conductive layer 230 is patterned to produce embedded microplates 232 which are preferably formed into a plurality of rows and columns. Preferably, lift-off techniques are used to patterning first conductive layer 230 in order to avoid the use of processes such as wet etching which require harsh chemicals and a high-temperature photoresist baking process. Alternatively, first conductive layer 230 may be patterned using standard photolithography with a room-temperature dried photoresist followed by dry plasma etching as known in the art.

Each embedded microplate 232 is preferably square and corresponds to a basic imaging pixel of the X-ray sensor (not shown). The width of each embedded microplate 232 is determined in accordance with the desired sensor spatial resolution and is typically on the order of tens to hundreds of microns (40 microns–500 microns). The gap between two adjacent microplates 232 is on the order of 5–20% of the microplate width, i.e. several microns to several tens of microns.

It is a particular feature of the present invention that the microplate structures described allow the inherent high spatial resolution nature of direct conversion X-ray materials to be realized using the readout techniques described hereinbelow. For example, when embedded microplates 232 are on the order of 50 microns, image readout with a spatial resolution of up to the Nyquist cutoff of 10 line pairs/mm can be realized with X-ray sensor 60 (FIG. 2B). The high spatial resolution does not require any sacrifice in thickness of the photoelectric conversion multilayer and thus does not cause degradation of the X-ray absorption performance of the X-ray sensor.

Moreover, and in contrast with the active matrix arrays that are known for use in the field of X-ray imaging, no thin-film transistor (TFT) addressing components, which are susceptible to high voltage damage, and no addressing electronics and associated interconnects are required to perform image readout.

Preferably, first dielectric layer 234 is deposited as a continuous layer over patterned first conductive layer 230. It is appreciated that first dielectric layer 234 is preferably perforated together with second dielectric layer 244.

First and second dielectric layers 234 and 244 are preferably dielectric polymers such as poly-para-xylylenes which may be applied as continuous conformal coatings in a room-temperature by vacuum deposition as known in the art. Preferably, the thickness of each of first and second dielectric layers 234 and 244 is in the range of one to tens of microns.

Second conductive layer 240 is deposited as a uniform layer over first dielectric layer 234 and then patterned to form a linear array of parallel elongate conductive strips 242 overlying the matrix array of embedded microplates 232 and separated therefrom by first dielectric layer 234. Preferably, conductive strips 242 terminate at two fanout interconnect regions (Not shown). Second conductive layer 240 is formed and patterned using the techniques described hereinabove with respect to formation and patternization of first conductive layer 230.

After second conductive layer 240 has been patterned, second dielectric layer 244 is uniformly formed thereover.

First and second dielectric layers 234 and 244 are preferably perforated at the same time to produce perforations 246. Each perforation 246 exposes at least part of a single embedded microplate 232. A matrix array of perforations 246 which corresponds to the matrix array of embedded microplates 232 is thus created. Perforations 246 are typically formed using successive steps of photolithography and plasma etching of a dielectric as known in the art.

In accordance with the current embodiment of the present invention, perforations 246 are preferably elliptical. The area of embedded microplates 232 exposed by perforations 246 is relatively small, approximately 5–15% of the overall embedded microplate 232 area.

After formation of perforations 246, third conductive layer 250 is deposited uniformly over perforated second dielectric layer 244. Third conductive layer 250 is formed and patterned using the techniques described hereinabove with respect to formation and patternization of first conductive layer 230. Third conductive layer 250 is patterned to produce two-dimensional matrix array of exposed microplates 252 formed into a plurality of rows and columns corresponding to embedded microplates 232. The dimensions and registration of exposed microplates 252 are preferably similar to those of embedded microplates 232.

During deposition of the conductive material forming third conductive layer 250, the walls of perforations 246 and exposed areas of embedded microplates 232 are also coated with the conductive material. Coating the perforations 246 creates electrically conducting channels between an exposed microplate 252 and its corresponding underlying embedded microplate 232.

Thus, a generally pixellated matrix array of storage capacitors is created whereby an electrically connected pair comprising an exposed microplate 252 and an embedded microplate 232 represents the first pole of a storage capacitor. This first pole is coupled to the photoelectric conversion multilayer 84 through embedded microplate 232 and is exposed to external charge injection through exposed microplate 252. The second pole of each storage capacitor is defined by the area of a conductive strip 242 intermediate the electrically connected pair of microplates. It is appreciated that using a single conductive strip as a counterplate for a column of pairs of discrete exposed microplates 252 and embedded microplates 232 results in a configuration whereby all opposing poles of a single column of storage capacitors are electrically connected.

In addition to serving as the counterplate for a column of storage capacitors, conductive strips 242 serve as data lines during readout of an X-ray image as described hereinbelow.

It is appreciated that the use of the term exposed when referring to the microplates indicates that the microplates are exposed to charge injection, i.e. that charge can be injected to the microplates in a non-contact manner. One method of charge injection as described herein is charge injection through a gap.

Figure 5A:
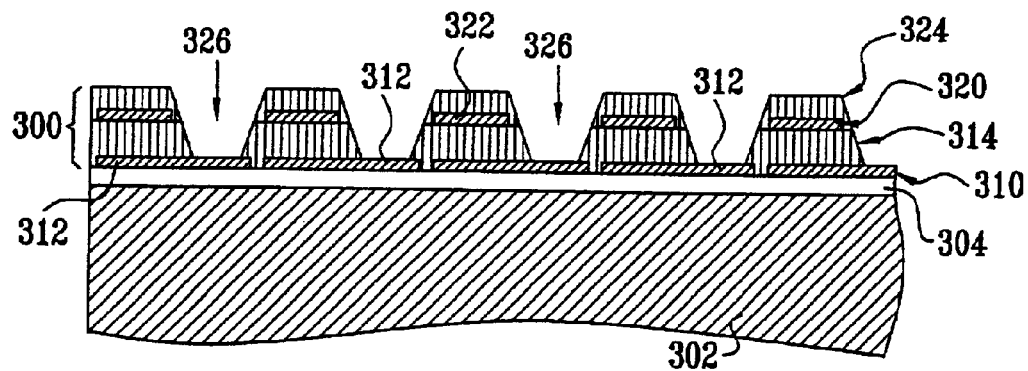
FIGS. 5A and 5B are illustrations of an alternate embodiment of part of the sectional illustration of FIG. 2B in accordance with an alternative embodiment of the present invention.
Figure 5B:
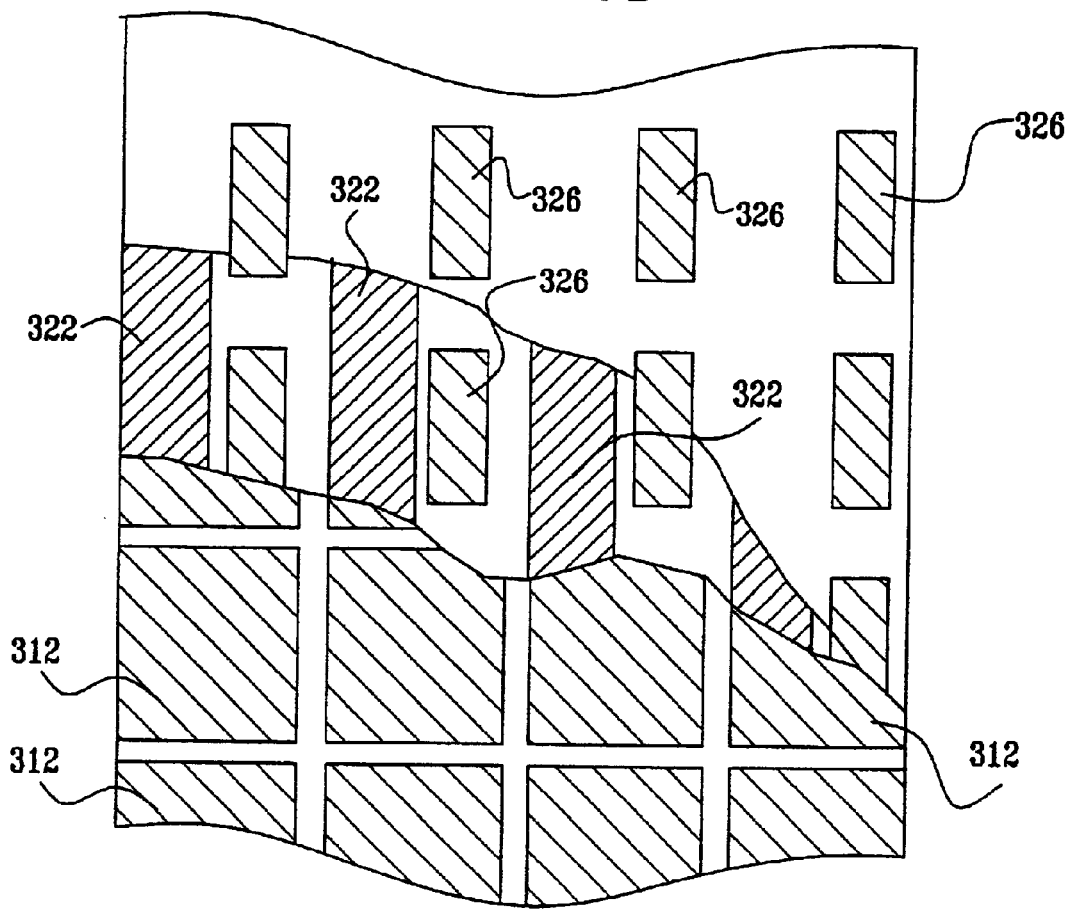

Reference is now made to FIGS. 5A and 5B which are respectively a cross-section and partially cut away top view illustrations of a multilayer capacitor array 300, constructed and operative in accordance with a further embodiment of the present invention. Multilayer capacitor array 300 may serve as an alternative to multilayer capacitor array 86 (FIG. 2B).

For the sake of simplicity, X-ray sensor (not shown) which may be identical to X-ray sensor 60 (FIG. 2B) is not shown in its entirety in FIG. 5A, and only a photoelectric conversion multilayer 302, an optional overlying passivation layer 304 and multilayer capacitor array 300 are shown.

Multi-layer capacitor array 300 preferably includes, from bottom to top, a first conductive layer 310 which is patterned to produce a two-dimensional matrix array of embedded microplates 312; an overlying first dielectric layer 314; an overlying second conductive layer 320 which is patterned to produce a linear array of parallel elongate conductive strips 322; an overlying second dielectric layer 324 which is preferably perforated to produce an array of perforations 326. Preferably, perforations 326 extend through first dielectric layer 314 and expose embedded microplates 312.

Preferably, first and second conductive layers 310 and 320, are formed and patterned as described herein above with particular reference to formation and patternization of first conductive layer 230 (FIGS. 4A and 4B).

Preferably, first and second dielectric layers 314 and 324 are formed and perforated as described hereinabove with particular reference to formation and perforation of first and second dielectric layers 234 and 244 (FIGS. 4A and 4B).

As in the embodiment of FIGS. 4A and 4B, the matrix array of perforations 326 corresponds to the matrix array of embedded microplates 312. However, in accordance with this embodiment, the perforations are preferably rectangular and have an area which is 30%–60% of embedded microplate 312. In this embodiment, exposure to charge injection is via the surface of embedded microplates 312 which is partially exposed by the perforation 326.

Reference is now made to FIG. 6 which is a partially cutaway top view schematic illustration of X-ray sensor 60 of FIG. 2B, constructed and operative in accordance with a preferred embodiment of the present invention. In accordance with this illustrated embodiment of the invention, multilayer capacitor array 86 is as described hereinabove with reference to FIGS. 4A and 4B.

Multilayer capacitor array 86 is coupled to integrated radiation data readout electronics 64 via the conductive strips 242 of second conductive layer 240, each of which terminates in a fanout connection region 340. There are typically two opposing fanout connection regions 340, one located at each side of the X-ray sensor 60. Preferably, and in order to reduce the density of connections at each fanout connection region, "odd" conductive strips 242 are terminated at one fanout connection region 340 and "even" conductive strips 242 are terminated at the second opposing fanout connection region 340. Conventional connection technologies such as those mentioned hereinabove may thus be used to provide removable or permanent electrical connection between X-ray sensor 60 and integrated radiation data readout electronics 64.

Integrated radiation data readout electronics 64 preferably comprises a plurality of multi-channel analog, low-noise charge readout ASICs (not shown) to measure integrated charge flowing to or from conductive strips 242 and the electrical ground (GND) of readout electronics 64 as known in the art and as described in applicant's co-pending application Ser. No. 09/989,319 filed Nov. 20, 2001 titled Hybrid Detector for X-ray Imaging the disclosure of which is incorporated herein by reference. Preferably, the ASICS (not shown) are mounted on printed circuit board 100 (FIG. 2B) using standard chip-on-board techniques.

Typically, for an X-ray sensor 60 having an imaging area of 24×30 cm that is suited for mammography, there are approximately 4800 conductive strips 242. The number of readout channels of multi-channel charge readout ASICs (not shown) is equal to or greater than the number of conductive strips 242, with each strip 242 preferably being connected to a single readout channel. Alternatively, several conductive strips 242 may be binned to a single channel, thereby reducing the spatial resolution in one dimension.

Figure 7:
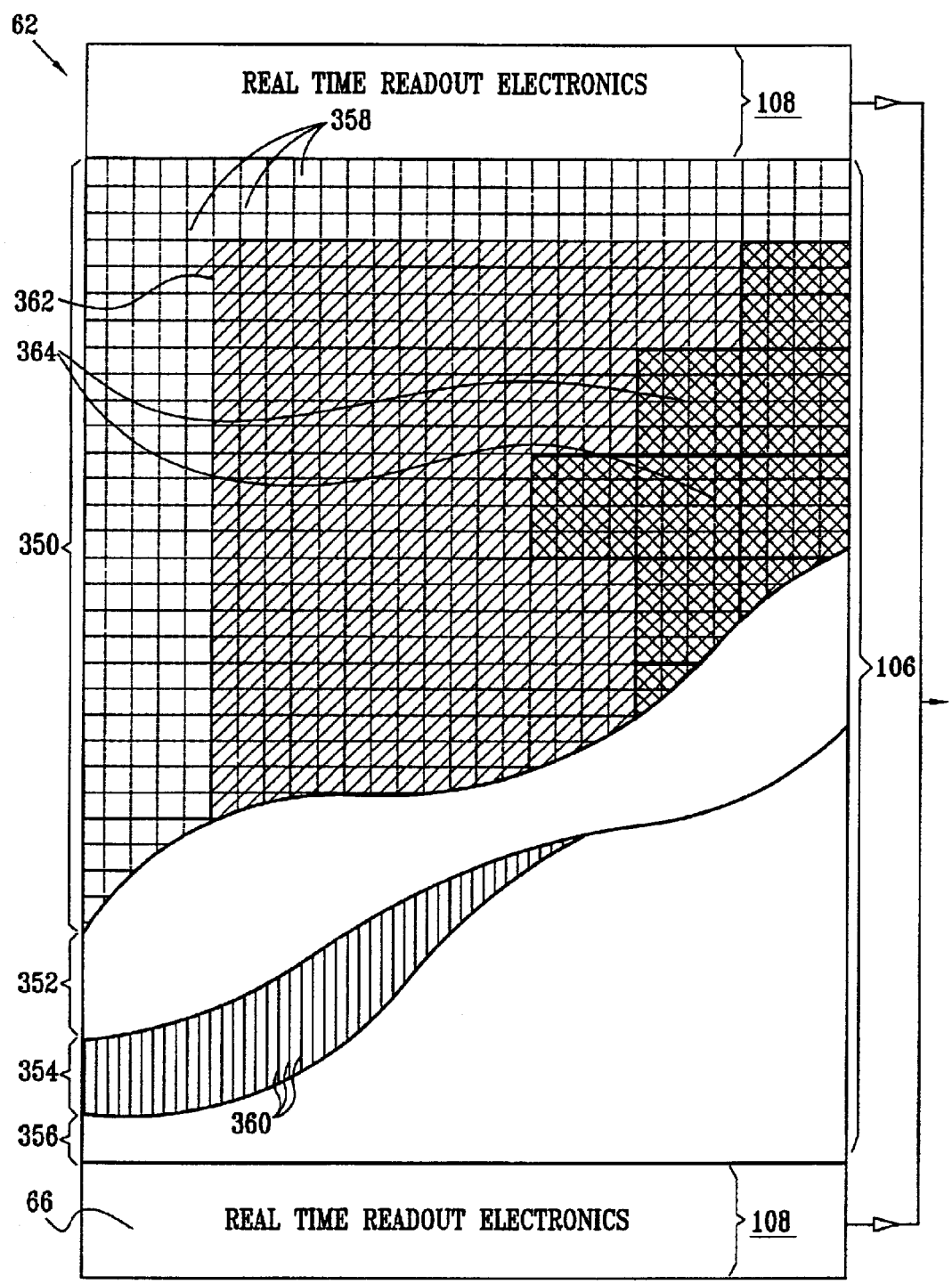
FIG. 7. is a partially cutaway top view illustration of a part of the image detection module of FIGS. 1, 2A–2B.

Reference is now made to FIG. 7 which is a partially cut away bottom view schematic illustration of ASV sensor 62 (FIG. 2B), constructed and operative in accordance with a preferred embodiment of the present invention. ASV sensor 62, which provides real-time exposure data, is preferably a multi-layer printed circuit board, having bendable portion 106 and rigid portions 108.

Bendable portion 106 is preferably a thin, X-ray permeable polyimide-based multi-layer PCB having, in downstream to upstream order with respect to the direction of X-ray impingement: a charge tracking layer 350, a dielectric layer 352, a connection layer 354, and a dielectric support layer 356. Both charge tracking layer 350 and connection layer 354 are preferably thin patterned conducting layers, typically copper, each having a thickness of several microns so as to be X-ray permeable. It is appreciated that the ASV sensor 62 is oriented within image detection module 50 such that the charge tracking layer 350 faces X-ray sensor 60 (FIG. 2B).

Charge tracking layer 350 is preferably a gold-coated copper layer, formed by conventional PCB manufacturing technologies to provide an array of generally coplanar discrete plate electrodes 358, preferably arranged in rows and columns. The structure of plate electrodes 358 determines the sensing apertures of the ASV sensor 62.

Preferably, plate electrodes 358 are square having dimensions in the range of several millimeters by several millimeters to tens of millimeters by tens of millimeters, in accordance with the desired resolution of ASV sensor 62 as described hereinbelow. It is appreciated that plate electrodes 358 with other geometries or dimensions may be employed.

Each plate electrode 358 of charge tracking layer 350 is preferably extended by a dedicated output line 360 in connection layer 354 through blind vias (not shown). During exposure to X-ray, real-time exposure data, in the form of charges, flows from each individual plate electrode 358 to a corresponding individual channel of real-time exposure data readout electronics 66 via corresponding output lines 360.

Output lines 360 are preferably routed in connection layer 354, which is generally electrostatically shielded from X-ray sensor 60 (FIG. 2), by charge tracking layer 350, thereby reducing cross-talk between signals of the ASV sensor 62. Alternatively, output lines 360 may be formed as part of charge tracking layer 350, the routing of the output lines 360 ensuring that the area occupied thereby must be significantly smaller than the area of plate electrodes 358, in order to reduce signal cross-talk. When output lines 360 are formed as part of charge tracking layer 350, the need for connection layer 354 is obviated.

In accordance with an alternative embodiment of the preferred invention, charge tracking layer 350 may comprise a relatively small number of large-area, fixed shape plate electrodes (not shown) which serve as regional sensors having sensing apertures similar to those of conventional automatic exposure control devices. It is appreciated that, in this case, information sensed by the ASV sensor is analogous to that sensed by regional density sensors and may include several distinctly readable fields.

An advantage of the approaches described herein is that the ASV sensor forms a simple integral component of image detection module 50 (FIG. 2B).

In addition to the thin multi-layer of the bendable portion 106, the rigid portions 108 preferably further include a fiberglass epoxy laminate such as FR4. Rigid portions 108 are preferably substrates upon which real-time exposure data readout electronics 66 is mounted using chip-on-board techniques and/or SMT as is known in the art. Connection layer 354, which extends over bendable region 106 and rigid portion 108, provides electrical interconnections between plate electrodes 358 and real-time exposure data readout electronics 66 through via holes (not shown) as known in the art.

Apparent surface voltages of microcapacitor array 86 of X-ray sensor 60 (FIG. 2B) which correspond to the amount of radiation absorbed thereby, are detected by ASV sensor 62 in real-time during exposure to X-ray radiation in the following manner: ASV sensor 62 is biased to a ground potential via real-time exposure data readout electronics 66. Due to the electrostatic conditions in the space 120 (FIG. 2B) between X-ray sensor 60 and ASV sensor 62, as described hereinbelow with particular reference to FIG. 10B, the charge redistribution in charge tracking layer 350 generally tracks and corresponds to the net charge pattern generated at X-ray sensor 60 (FIG. 2B) during exposure. Charge redistribution in charge tracking layer 350 causes measurable currents to flow in real-time exposure data readout electronics 66, thereby providing real-time signal representation of apparent surface voltages of X-ray sensor 60 (FIG. 2B).

The sensing resolution of the charge tracking is a function of the space 120 (FIG. 2B) separating the ASV sensor 62 from X-ray sensor 60 (FIG. 2B) and the strength of the electric field thereacross. The spatial resolution of ASV sensor 62 is limited by the spatial resolution of the charge tracking, with the actual resolution being determined by the dimensions and quantity of plate electrodes 358.

It is appreciated that the same image is generally sensed by both X-ray sensor 60 and ASV sensor 62. However, the sensing resolution of X-ray sensor 60 is significantly higher than the sensing resolution of ASV sensor 62.

It is appreciated that the number of readout channels of real-time exposure data readout electronics 66 preferably corresponds to the number of plate electrodes 358. The number of plate electrodes 358 is preferably in the range of hundreds to several thousand. It is appreciated that increasing the number of plate electrodes 358 provides increased spatial resolution of ASV sensor 62 and enhanced resolution "imagewise" data. The precise number of plate electrodes 358 is selected in accordance with a tradeoff between the number of plate electrodes 358 required to provide generally imagewise real-time exposure information, which is preferably large, and the number of plate electrodes 358 required for real-time data processing, which is preferably small.

Real-time exposure data readout electronics 66 is preferably as described in applicant's co-pending application, Ser. No. 09/989,319.

In accordance with a real-time processing algorithm described in applicants co-pending application co-pending application, Ser. No. 09/989,319, by detecting the borders of an irradiated field across X-ray sensor 60 (FIG. 2B), a global group 362 of plate electrodes 358 included within borders of the irradiated field may be used to provide imagewise feedback information for automatic exposure control. Alternatively or additionally, selective regional groups 364 of plate electrodes 358 may be programmed to provide automatic exposure control.

Dose control allows examinations does optimization. Moreover, instead of using prior art fixed aperture and fixed field density sensors typically associated with prior art phototimers and other exposure control devices, the present invention provides generally imagewise real-time exposure data which enables real-time image contrast feedback to be employed for dose optimization. The present invention may thus enable a lowering of the dose required to reach desired diagnostic image contrasts.

In the embodiment shown in FIG. 7, ASV sensor 62 comprises a single multilayer PCB. However, and in accordance with the size of the image detection module 50 (FIG. 2B) into which ASV sensor 62 is incorporated, the ASV sensor 62 may in fact comprise several multilayer PCB's each comprising bendable portions and rigid regions tiled to create an expanded flexible region. In accordance with an alternative embodiment of the present invention, instead of being formed from relatively "thick" film layers, ASV sensor 62 may consist of a thin-film multilayer.

Figure 8:
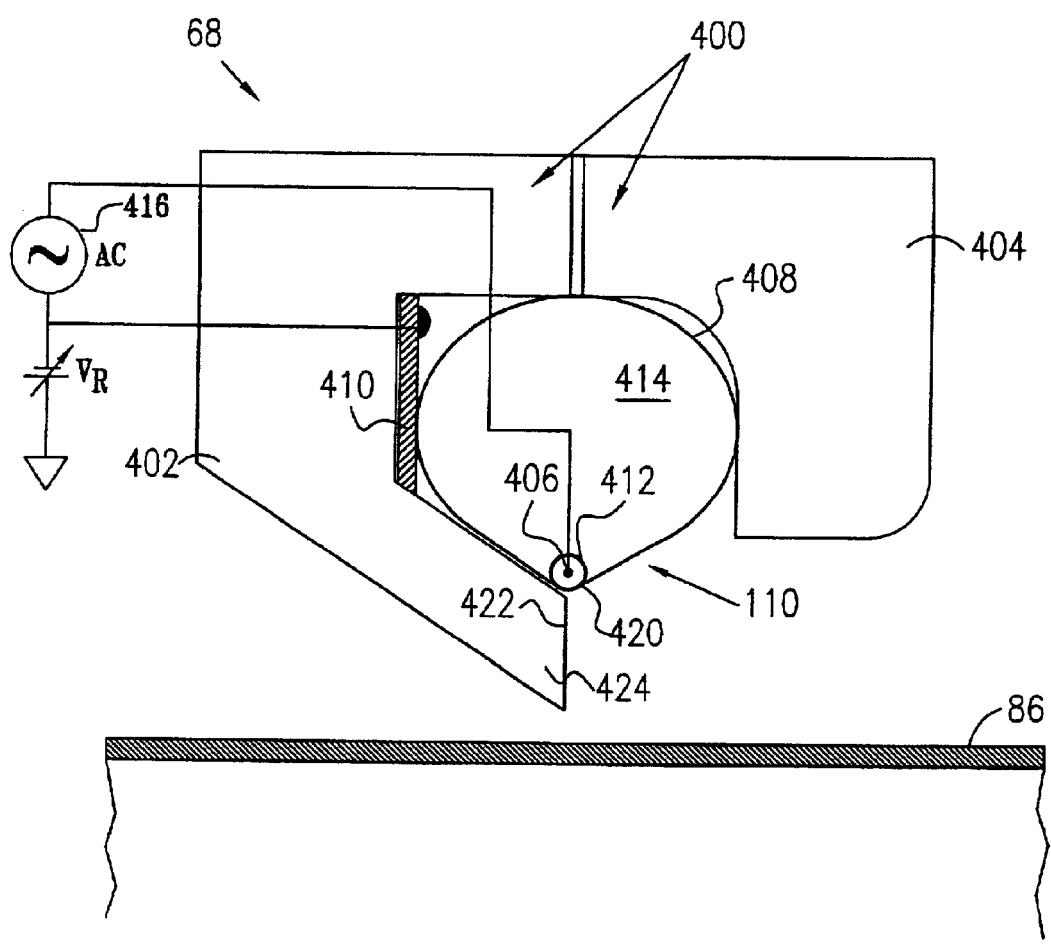
FIG. 8. is a cross-sectional illustration of an elongate scanner which forms part of the system of FIGS. 2A–2B.

Reference is now made to FIG. 8 which is a cross-sectional illustration of elongate scanner 68 and multilayer capacitor array 86 of FIG. 2B, useful in understanding the operation thereof.

Elongate scanner 68 preferably is comprised of two main elements, the elongate charge injector 110 and a housing assembly 400.

Housing assembly 400 is typically formed of two subassemblies 402 and 404 which are fastened using conventional mechanical means (not shown). When fastened, subassemblies 402 and 404 securely hold and align charge injector 110. Suitable materials for housing assembly 400, which is used to provide elongate scanner 68 with mechanical stiffness and straightness, may include glass, ceramics or metals such as aluminum or stainless steel.

Charge injector 110 includes an embedded elongate electrode 406, having a first connection terminal (not shown), and an exposed screen electrode 408 having a second connection terminal (not shown) via a connection wall 410 made of a conductive coating on an inner surface of housing subassembly 402. It is appreciated that when subassembly 402 is formed of an electrically conductive material, the conductive coating is obviated.

Embedded elongate electrode 406 is preferably a thin conductive wire electrode, having a thickness of a few hundred microns and having a thin dielectric coating 412, such as glass, typically several tens of microns in thickness. Embedded elongate electrode 406 is preferably mounted onto an elongate dielectric support 414, which is typically a rod formed of glass, alumina or other dielectric ceramics. Exposed screen electrode 408 is preferably formed by winding a thin conductive wire having a thickness of tens to hundreds of microns, into generally mutually spaced coils over elongate dielectric support 414 and embedded elongate electrode 406. Preferably, exposed screen electrode 408 provides an electrostatic shield for embedded electrode 406.

It is appreciated that alternative configurations for an embedded elongate electrode and an elongate screen electrode are possible, it being appreciated that the relationship between and the geometry of the embedded elongate electrode, the exposed screen electrode and dielectric coating determines the capacitance, and therefore the electrical impedance, of charge injector 110.

Charge injector 110 is activated, continuously or in bursts, by applying between its two terminals, a modulated AC voltage, from voltage source 416, which is typically a floating sine wave with an amplitude on the order of 2000–2,500 volts peak-to-peak and a frequency between several tens of kilohertz to a few megahertz. The AC voltage is selected to produce an AC electric field sufficiently strong to cause discharge in air at exposed regions of dielectric coating 412 where exposed screen electrode 408 intersects embedded elongate electrode 406. Thus, in accordance with the structure described herein, an elongate discharge site 420 is defined, at which discharge occurs during activation of charge injector 110.

The aforesaid discharge preferably results in the generation of a relatively large quantity of positive and negative charges, with the amount of charge generated being generally dependent on the frequency and amplitude of the AC voltage. A fraction of the generated charge may be injected onto multilayer capacitor array 86 in the following manner: Charges (positive or negative) are preferably injected from elongate discharge site 420 into multilayer capacitor array 86 by injection forces created when a potential difference appears between exposed screen electrode 408 and the multilayer capacitor array 86. Typically a reference voltage VR, relative to the ground of integrated readout electronics 62 (FIG. 2B), is applied to exposed screen electrode 408. Reference voltage VR is an adjustable, preferably negative, DC voltage in the range of zero to several hundreds of volts.

Charge injection from charge injector 110 into multilayer capacitor array 86 is typically self-quenching. Space charges created by the accumulation of charge at multilayer capacitor array 86 progressively reduce the injection forces to a generally negligible value. The amount of charge actually injected by charge injector 110 at each capacitor of the multilayer capacitor array 86 depends on the charge density retained thereat prior to charge injection. However, it is appreciated that the final accumulated charge density at multilayer capacitor array 86 is not generally influenced by initial or residual charge accumulated at capacitors of multilayer capacitor array 86, since the injection contains charges of both polarities. The final accumulated charge density is primarily determined by the polarity and amplitude of reference voltage VR applied to exposed screen electrode 408.

Charge injection into multilayer capacitor array 86 is spatially tailored by an electrostatic barrier 422 of an elongate wedge 424 of housing assembly 400.

Figure 9:
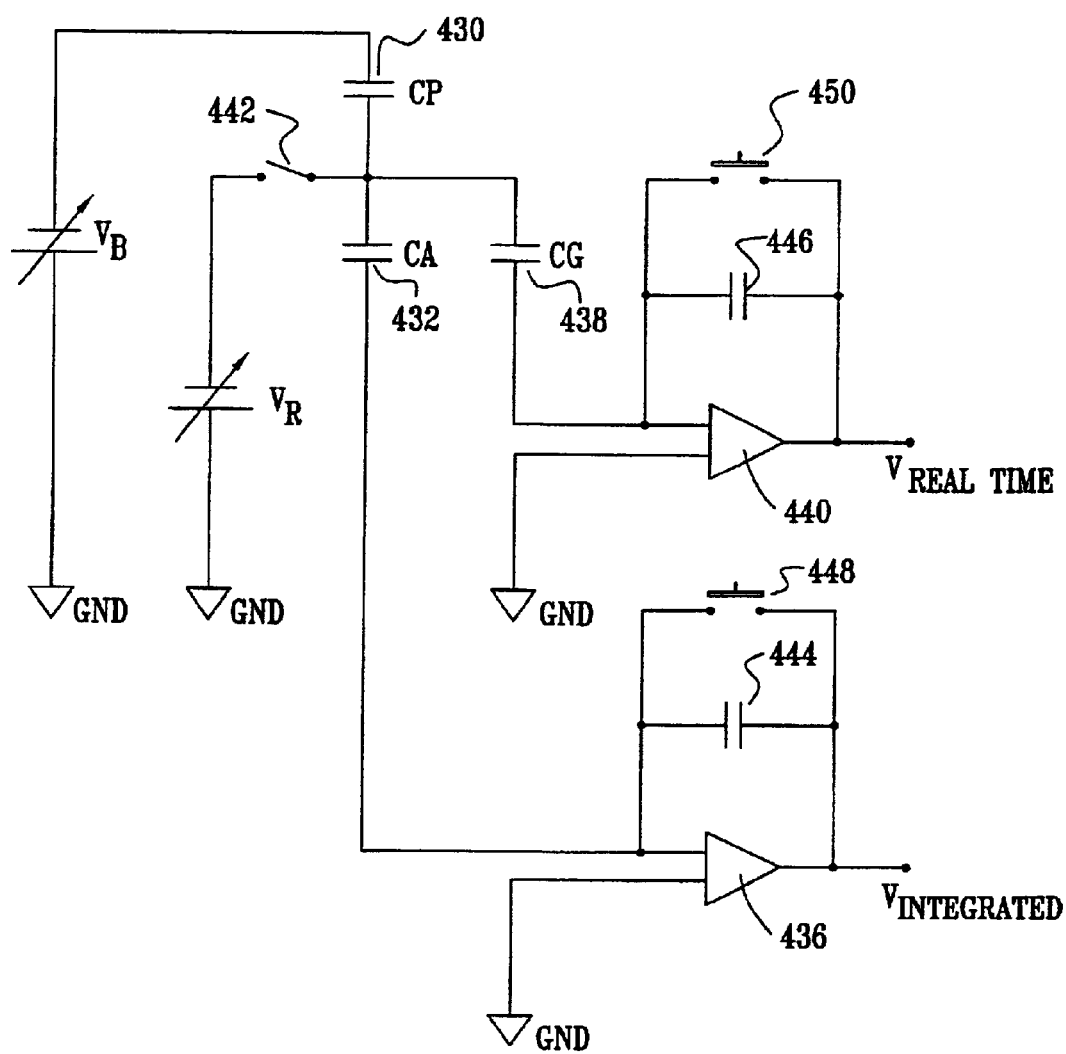
FIG. 9 is a simplified electrical circuit diagram showing a simplified electrical equivalent of the X-ray sensor which forms part of the image detection module of FIGS. 1, 2A–FIG. 2B.

Reference is now made to FIG. 9 which is a schematic circuit diagram showing a simplified electrical equivalent of the image detection module 50 of FIGS. 1, 2A–2B, useful in understanding the present invention.

A capacitor CP indicates a specific capacitance of photoelectric conversion multilayer 84 (FIG. 2B). One electrode pole 430 of capacitor CP represents a corresponding specific area of back electrode 82 (FIG. 2B).

A capacitor CA indicates a capacitance of a single storage capacitor of multilayer capacitor array 86 (FIG. 2B). When using an amorphous selenium based material as the photoelectric conversion layer, image detection module 50 is preferably designed so that capacitance CA is preferably 1–2 orders of magnitude greater than CP. One electrode pole 432 of capacitor CA represents the part of a single line elongate conductive strip 242 (FIGS. 4A and 4B) of second conductive layer 240 (FIGS. 4A and 4B) that is associated with a single storage capacitor of multilayer capacitor array 86 (FIG. 2B). Electrode pole 432 of capacitor CA is electrically connected to a first charge integrator 436, representing a single channel of integrated radiation data readout electronics 64 (FIG. 2B).

A capacitor CG indicates a capacitance of ASV sensor 62 (FIG. 2B), that is the capacitance created between charge tracking layer 350 (FIG. 7) and third conductive layer 250 (FIGS. 4A and 4B) of multilayer capacitor array 86 associated with space 120 (FIG. 2B).

One electrode pole 438 of capacitor CG, representing a single plate electrode 358 (FIG. 7) of charge tracking layer 350 (FIG. 7), is electrically coupled to a second charge integrator 440 representing a single channel of real-time exposure data readout electronics 66 (FIG. 2B).

Capacitors CA and CG are connected in parallel through the common ground (GND) of first charge integrator 436 and second charge integrator 440.

Adjustable voltage VR represents the reference voltage applied to a screen electrode of charge injector 110 (FIGS. 2B and 8) as described hereinabove with reference to FIG. 8. A switch 442 is an electrical equivalent representing the effect of activation of charge injector 110 (FIGS. 2B and 8).

Adjustable voltage VB represents the bias potential applied to back electrode 82 (FIG. 2B).

Each first and second charge integrator 436 and 440, includes a feedback capacitor 444 and 446, respectively, determining the charge readout gain, and associated reset switches 448 and 450 respectively. Reset switches 448 and 450 allow the charge integrators to move from idle reset mode to integrating mode.

Figure 10A:
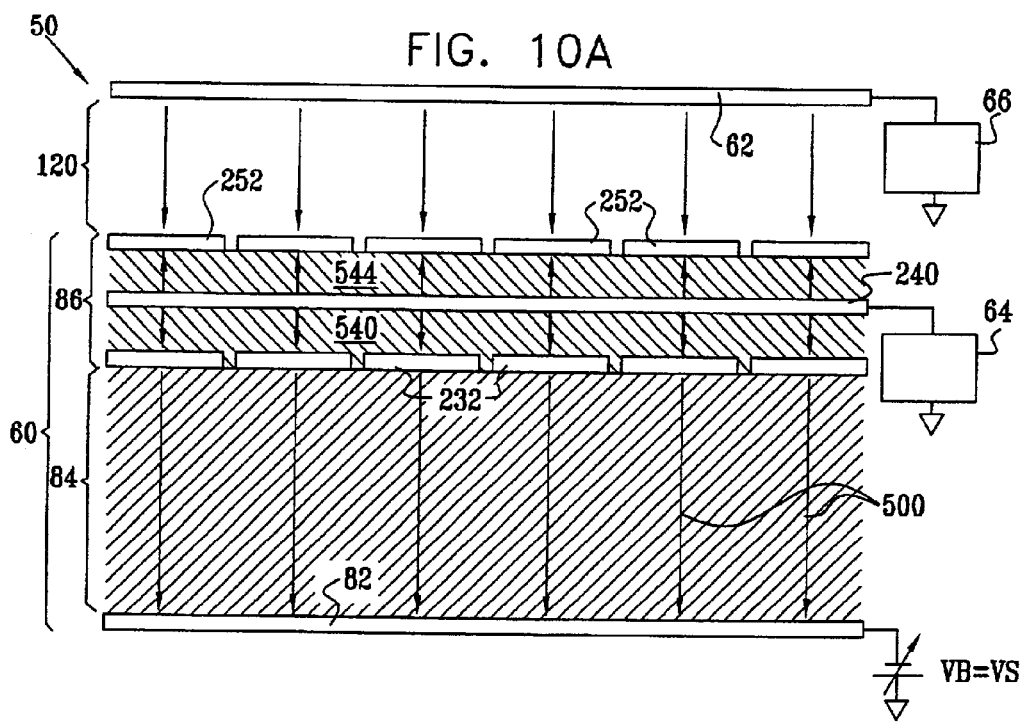
FIGS. 10A, 10B, and 10C are simplified illustrations useful in understanding the operation of the image detection module shown in FIGS. 1, 2A–2B.
Figure 10B:
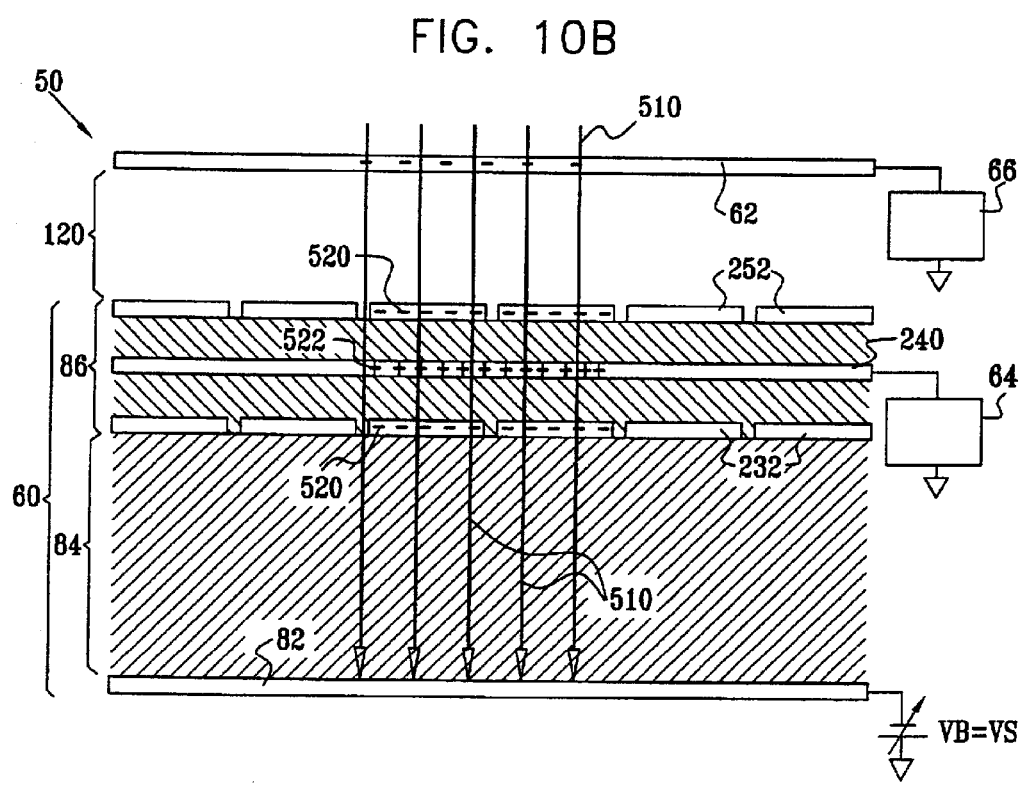
Figure 10C:
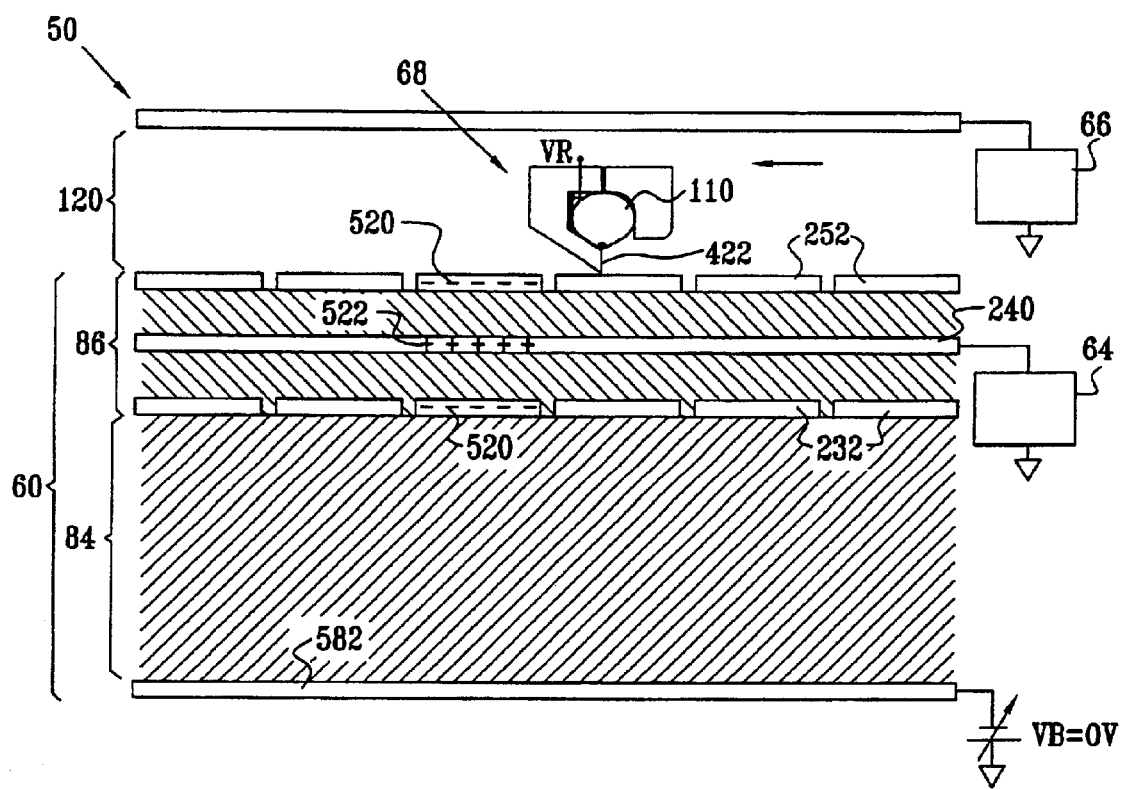

Reference is now made to FIGS. 10A, 10B and 10C which illustrate the operation of image detection module 50 constructed and operative in accordance with a preferred embodiment of the present invention. In accordance with this preferred embodiment of the present invention, multilayer capacitor array 86 is as described hereinabove with reference to FIGS. 4A and 4B.

For ease of understanding, the scales of the various elements are enlarged.

Figure 11A:
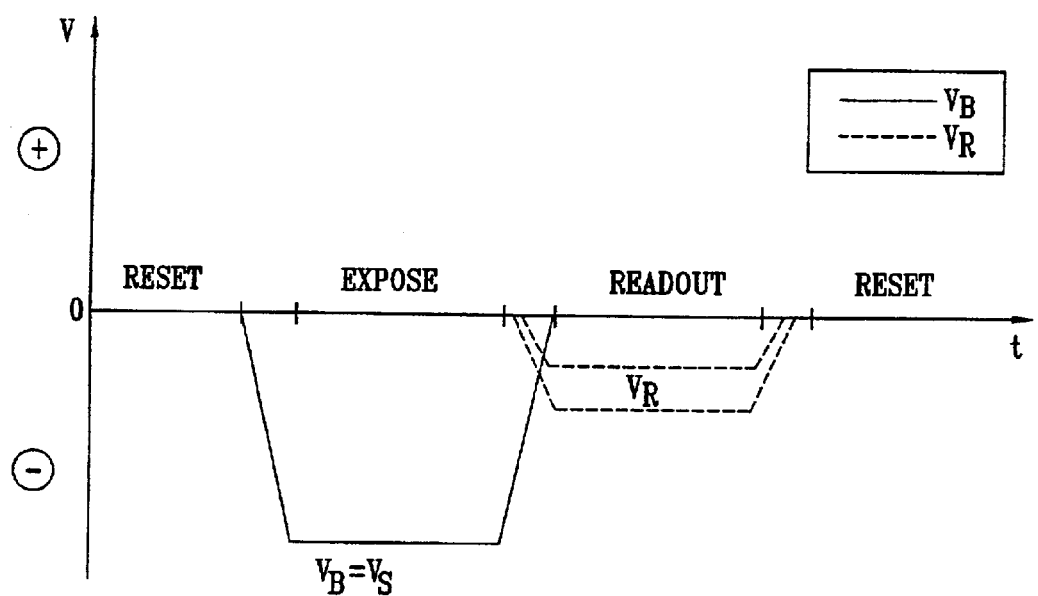
FIGS. 11A and 11B are timing diagrams associated with the operation of the image detection module shown in FIGS. 1, 2A–2B.
Figure 11B:
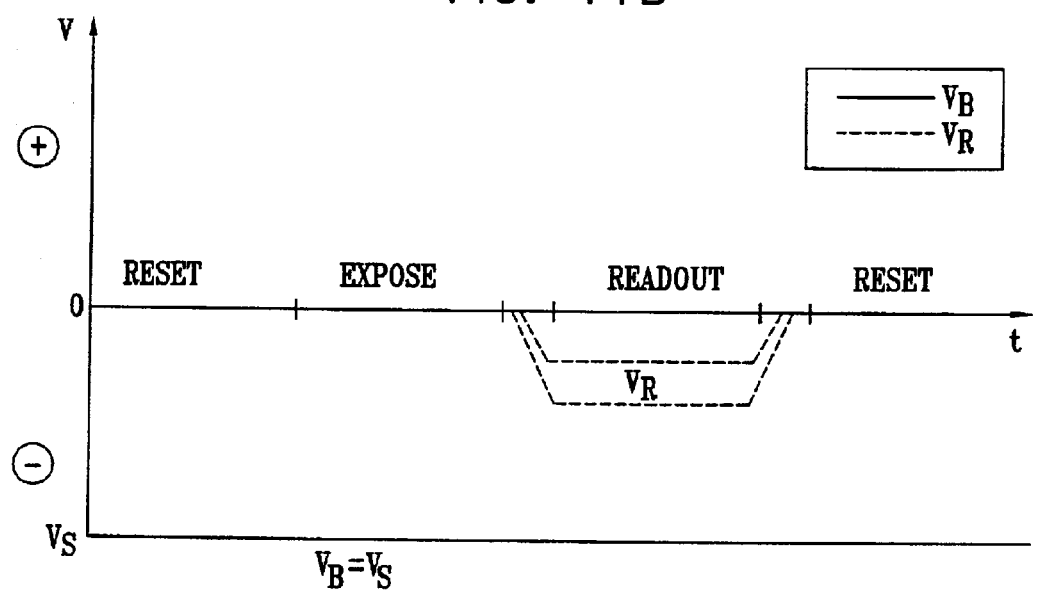

Reference is also made to FIGS. 11A and 11B. FIG. 11A is a timing diagram of the signals associated with the operation of image detection module 50 in accordance with a preferred embodiment of the present invention. FIG. 11B is a timing diagram of the signals associated with the operation of image detection module 50 in accordance with an alternative embodiment of the present invention.

Each imaging cycle begins with the reset of X-ray sensor 60 by adjusting the bias voltage VB applied to back electrode 82 set to ground of integrated radiation data readout electronics 64. Elongate scanner 68 (FIG. 10C) then sweeps across X-ray sensor 60.

During the sweep, charge injector 110 (FIG. 10C) is activated. Reference voltage VR is set to zero and applied to the screen electrode (not shown) of charge injector 110 (FIG. 10C). Self-quenching charge injection from charge injector 110 (FIG. 10C) causes X-ray sensor 60 to be discharged to an apparent surface voltage (ASV) of zero volts which corresponds to the reference voltage VR during the sweep. Self-quenched charge injection is described hereinabove with particular reference to FIG. 8.

Thus, as can be understood from the electrical equivalence circuit shown in FIG. 9, when VB=0 and VR=0 and switch 442 is closed, representing the activation of charge injector 110 (FIG. 10C) during a sweep, capacitors CP, CA and CG are fully discharged. By discharging capacitors CP, CA and CG, X-ray sensor 60 is effectively reset and made ready for exposure to an X-ray image.

Following the reset step, X-ray sensor 60 is prepared for the step of X-ray exposure by ramping voltage VB to a value equal to sensitizing voltage VS. Correspondingly, capacitors CP, CA and CG are charged. As shown in FIG. 10A, when X-ray sensor is ready for exposure, potential differences and therefore electric fields indicated by arrows 500 develop across the photoelectric conversion multilayer 84 and multilayer capacitor array 86.

Typically, the value of sensitizing voltage VS, which is selected in order to create a high, but sustainable, electric field across photoelectric conversion multilayer 84, is on the order of several hundred to several thousand volts, with the exact value depending on the thickness of photoelectric conversion multilayer 84. When the bulk of photoelectric conversion multilayer 84 is amorphous selenium or a selenium-based alloy, sensitizing voltage VS is preferably negative, and the desired field strength is typically in the range of 5–20 volts/micron, and preferably is 10 volts/micron. Creation of an electric field within photoelectric conversion multilayer 84 causes electrical sensitization in preparation for exposure to X-ray radiation, with a higher field strength providing increased sensitivity to X-ray radiation.

The typically unipolar charge blocking layers overlying and underlying the photoelectric conversion layer of photoelectric conversion multilayer 84, described hereinabove with particular reference to FIG. 2B, respectively limit injection of positive charge from the multilayer capacitor array 86 and injection of negative charge from back electrode 82 into the bulk of sensitized photoelectric conversion multilayer 84.

The voltage which develops across multilayer capacitor array 86 is typically 1–2 orders of magnitude smaller than that which develops across photoelectric conversion multilayer 84 corresponding to the relationship between capacitance CA and capacitance CP (FIG. 9) as described hereinabove. Since there is an electrical connection between embedded microplates 232 and exposed microplates 252, the potentials developed across multilayer capacitor array 86 appear electrostatically as Apparent Surface Voltages (ASVs) over exposed microplates 252.

In accordance with an alternative embodiment of the present invention, multilayer capacitor array 86 may be identical to multilayer capacitor array 300 of FIGS. 5A and 5B. In this case, the perforations 326 (FIG. 5B) expose embedded microplates 312 (FIG. 5A) so that the potentials developed across the multilayer capacitor array 86 also appear electrostatically as Apparent Surface Voltages (ASVs).

Sensitization is typically carried out immediately after a PREPARE trigger is received by image detection module 50 and immediately prior to X-ray exposure. The PREPARE trigger may be a result of a technologist pressing a manual prepare switch, such as those employed with conventional X-ray and mammography systems.

Following sensitization, a uniform electric field is also created in space 120, and a uniform charge distribution corresponding to the ASV of X-ray sensor 60 is created in the charge tracking layer 350 (FIG. 7) of ASV sensor 62. The charge tracking layer 350 (FIG. 7) of ASV sensor 62 is biased to ground via real-time exposure data electronics 66.

After being sensitized, image detection module 50 is ready for the step of exposure to spatially modulated X-ray imaging radiation 510 as illustrated in FIG. 10B. During exposure to X-ray radiation 510, elongate scanner 68 (FIG. 10C) is stationary, overlying non—active regions of X-ray sensor 60. Typically elongate scanner 68 overlies a shielded region during X-ray exposure as described hereinabove, thus the charge injector 110 (FIG. 10C) is not typically directly exposed to X-ray radiation. Accordingly, elongate scanner 68 is not illustrated in FIGS. 10A and 10B. It is appreciated that field lines are not shown in FIGS. 10B and 10C. Instead, associated net charge pattern distributions are shown.

X-ray imaging radiation 510 is generally absorbed by photoelectric conversion multilayer 84, with the absorbed radiation constituting a transmission modulated X-ray image of an object, such as a region of the human body.

In accordance with an alternative embodiment of the present invention, when the X-ray sensor 60 is identical to X-ray sensor 150 of FIG. 3, X-ray imaging radiation is partially absorbed by the scintillator multilayer 160 and partially absorbed by photoelectric conversion multilayer 84.

Photons, which are by nature much more energetic than the band gap of the photoelectric conversion multilayer 84, photo-generate free electron/hole pairs in photoelectric conversion multilayer 84 in accordance with the spatially modulated pattern of the impinging radiation. The electric field present across photoelectric conversion multilayer 84, causes the electron/hole pairs which survive recombination to separate as free charge carriers of opposite polarities which transit in opposing directions along electric field lines indicated by arrows 500 (FIG. 10A) which are perpendicular to the plane of photoelectric conversion multilayer 84.

It is appreciated that since the electric field across photoelectric conversion multilayer 84 remains generally constant during exposure, space charge effects are negligible and charge carrier transit takes place along generally straight field lines generally normal to the plane of photoelectric conversion multilayer 84, with virtually no sideways displacement (lateral spread) of charge thereby maintaining high spatial resolution during X-ray imaging.

During X-ray exposure and corresponding photogeneration of free charge carrier pairs in photoelectric conversion multilayer 84, negative charge carriers move towards embedded microplates 232 of first conductive layer 230 (FIG. 4A) and are collected and retained thereby. Positive charge carriers move towards back electrode 82 and are swept to the voltage source thereby. Charge redistribution occurs both in second conductive layer 240 and back electrode 82 since the potential therebetween is maintained at constant level of VS. Thus, multilayer capacitor array 86, which had been charged to a spatially constant DC value during sensitization (VB=VS), now bears an additional spatially modulated charge pattern, corresponding to the spatially modulated X-ray image.

As a result, exposed microplates 252 and embedded microplates 232 retain a net spatial charge pattern 520, and second conductive layer 240 retains a corresponding net counter charge pattern replica 522. X-ray exposure and creation of the spatial charge pattern at multilayer capacitor array 86, yields patterning of the previously uniform ASV of X-ray sensor 60.

It is a particular feature of the present invention that during exposure, as a result of changes in the ASV of X-ray sensor 60, corresponding charge redistribution occurs in the plates 358 (FIG. 7) of charge tracking layer 350 (FIG. 7) of ASV sensor 62. The charge redistribution causes measurable currents to flow through real-time exposure data readout electronics 66, providing a real-time indication of the spatially modulated X-ray radiation impinging on X-ray sensor 60.

Charge redistribution during exposure may be better understood by referring back briefly to the equivalent circuit of FIG. 9. Switch 442 is disconnected during exposure since the charge injector is not activated. CP and CA are connected in series to a bias voltage VB, which is constant and equal to VS during exposure. As a result of photogeneration, CP is discharged by an amount of charge Q associated with the number and energy of X-ray photons absorbed in photoelectric conversion multilayer 84 (FIG. 10B). Since charge redistribution occurs in order to maintain the constant potential difference VS, CA is thereby charged correspondingly by an amount of charge which is approximately equal to Q.

Since CA and CG are connected in parallel, CG is also charged to a value which is proportional to the charge amount Q. During exposure, charge integrator 440 (FIG. 9), which is in active mode, measures current flowing therethrough to capacitor CG thus providing real-time output which is proportional to the total amount of charge flowing through CG, therefore providing real-time exposure data.

During X-ray exposure, charge integrator 436 is in idle/reset mode therefore integrating readout capacitor 444 is shorted. It is appreciated that real-time exposure data is read out from the ASV sensor 62 during exposure only. During other stages of imaging, the ASV sensor has no role and charge integrator 440 (FIG. 9) is in idle/reset mode.

Referring back to FIG. 10B, the amount of X-ray radiation dose is sensed by ASV sensor 62, and the X-ray radiation exposure is controlled using feedback from real-time exposure data readout electronics 66 to system host computer 38 (FIG. 1) as described in applicant's co-pending application Ser. No. 09/989,319 to provide automatic exposure termination and dose control. Alternatively, X-ray exposure may be terminated after the elapse of a predetermined amount of time, set by a technologist.

Providing real-time exposure sensing functionality in image detection module 50 obviates the need for external phototimers or automatic exposure control (AEC) apparatus and methods. Elimination of such apparatus enables reduction of the distance separating the image detection module 50 from the object being imaged with correspondingly decreased image magnification. In addition, providing real-time exposure sensing functionality by image detection module 50 eliminates the need for calibration and correction which would otherwise be required to compensate for the differences in spectral sensitivities at different X-ray tube kVp values that would occur were an external AEC device to be used.

Moreover and importantly, real-time exposure data is sensed by ASV sensor 62 without interfering with or attenuating spatially modulated X-ray imaging radiation 510, detected by X-ray sensor 60.

Following exposure and prior to commencement of readout, bias voltage VB is preferably ramped down from VS to a zero level. Thus multilayer capacitor array 86 is discharged from a spatially constant DC value retaining in a net charge pattern 520 which corresponds to the X-ray image.

Reference is now made to FIG. 10C which illustrates the step of readout of net charge pattern 520 which corresponds to the X-ray image detected by X-ray sensor 60. Readout occurs through sequential line-by-line charge injection from sweeping elongate scanner 68 along a row of exposed microplates 252. The sequential line-by-line charge injection uniformizes the charge on the rows of exposed microplates 252 in a raster-like manner.

It is appreciated that electronic addressing means are not required. Instead, each row of multilayer capacitor array 86 is addressed by charge injection from the elongate scanner 68 as it sweeps across the multilayer capacitor array 86. Readout of each addressed line is preferably carried out by measuring counter charge flow through the strip electrodes 242 (FIG. 6) of second conductive layer 240 of multilayer capacitor array 86.

During readout, elongate scanner 68 sweeps across X-ray sensor 60 in the direction shown in FIG. 10C in synchronization with the operation of integrated radiation data readout electronics 64. The sweep velocity is determined and controlled by an electromechanical driver (not shown). During the sweep, charge injector 110 is activated and voltage VR is applied to screen electrode 408 (FIG. 8) thereof. Self-quenched charge injection from charge injector 110 into a row of exposed microplates 252 forming part of multilayer capacitor array 86 occurs along elongate electrostatic barrier 422.

During the sweep by elongate scanner 68, charge injector 110 may be periodically activated in bursts with a duty cycle and frequency which correspond to a charge sampling time and a frequency of raster lines. Alternatively, the charge injector 110 may be continuously activated during readout, independently of the charge sampling time and frequency. In accordance with either embodiment, the time elapsed between subsequent charge samplings corresponds to the spatial displacement of elongate scanner 68 along adjacent rows of exposed microplates 252.

With each readout of a raster line during the sweep of elongate scanner 68, the charge accumulated at a new row of exposed microplates 252 along electrostatic barrier 212 is uniformized to an ASV value which generally corresponds to screen electrode voltage VR, which may be zero. At rows of multilayer capacitor array 86 which are upstream of the position of electrostatic barrier 422 during the sweep, the electric field is tailored by electrostatic barrier 422 to shield the ASV from the operation of charge injector 110. Thus, charge injection to exposed microplates 252 at rows upstream of electrostatic barrier 422 is generally prevented. The ASV of that portion of the multilayer capacitor array 86 whose charge has not yet been uniformized maintains imagewise patterning in accordance with the X-ray image information until charge uniformization occurs thereat.

It is appreciated that the region of multilayer capacitor array 86 exposed to charge injection during readout is downstream of the electrostatic barrier 422. The extent of this region is typically greater than the width of one row and may cover many rows. Due to the self-quenching nature of the charge injection, the ASV of exposed microplates 252 which has been made uniform by charge injection, generally does not undergo further changes after uniformization. Therefore, the counter charge pattern replica 522 in the second conductive layer 240 undergoes line-by-line charge redistribution in accordance with the sweep of elongate scanner 68, as the charge is uniformized on corresponding rows of exposed microplates 252.

Line-by-line charge redistribution of spatial counter charge pattern replica 522 causes measurable currents, associated with each new line of the X-ray image being read out, to flow in each strip 242 (FIG. 6) of second conductive layer 240. These flowing currents are sensed and read out by integrated data readout electronics 64 to provide an electrical signal representation of the transmission modulated X-ray imaging radiation 510 (FIG. 10B). Data from each pixel of the raster line being read out is preferably represented by the current flowing to/from a corresponding conductive strip 242 (FIG. 6). Since readout from conductive strips 242 (FIG. 6), together representing each raster line, is carried out in parallel, a frame of data including an entire image can be read out in seconds.

Readout may be better understood by once again referring to the equivalent circuit of FIG. 9. During readout, switch 442 is closed, representing charge injection activation. Voltage applied to screen electrode 408 (FIG. 8) is set to VR. The charge injection causes capacitor CA to be charged/discharged to the value VR, with the charging/discharging current being measured by charge integrator 436. Charge integrator 436 is in the active mode and switch 448 is open during readout.

Preferably, all raster lines comprising an X-ray image are read out during a single sweep of elongate scanner 68. Following the sweep, the ASVs of the capacitors forming multilayer capacitor array 86 are typically uniformized and made equal to the readout bias voltage value VR. It is appreciated that readout bias voltage VR may be set to be equal to zero. In this case, X-ray sensor 60 reset occurs concurrently with the step of image readout.

When the dark current across X-ray sensor 60 is relatively high, then it is preferable to use the voltage regime shown in FIG. 11A. In this implementation, X-ray sensor 60 is sensitized (VB=VS) immediately prior to exposure and is ramped down to zero (VB=0) prior to readout. For implementations in which the dark current of X-ray sensor 60 is relatively low, a simpler voltage regime such as the one shown in FIG. 11B may be used. In this regime, VB remains constant at a relatively high voltage (VB=VS) throughout the imaging cycle.

It is a particular feature of the present invention that increased dark current can also be compensated for by selecting VR such that a DC component, associated with the dark current, is factored out, thus providing an automatic tone scale remapping of the image being read out as described in applicant's co-pending application Ser. No. 09/989,319 the disclosure of which is incorporated herein by reference.

Figure 12A:
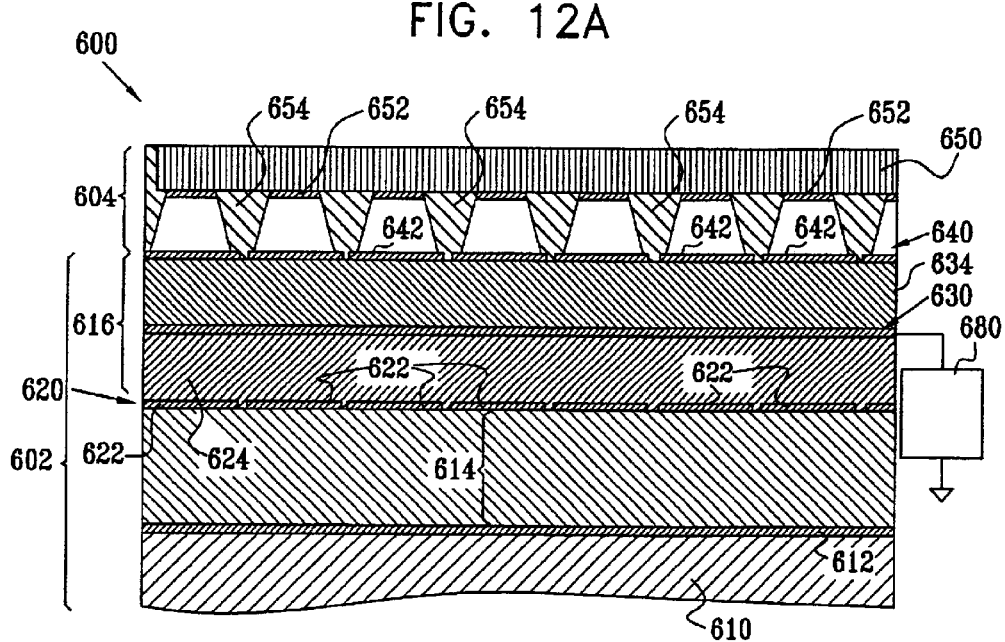
FIGS. 12A and 12B are respective simplified pictorial and sectional illustrations of an image detection module forming part of the system of FIG. 1 in accordance with an alternative embodiment of the present invention.
Figure 12B:
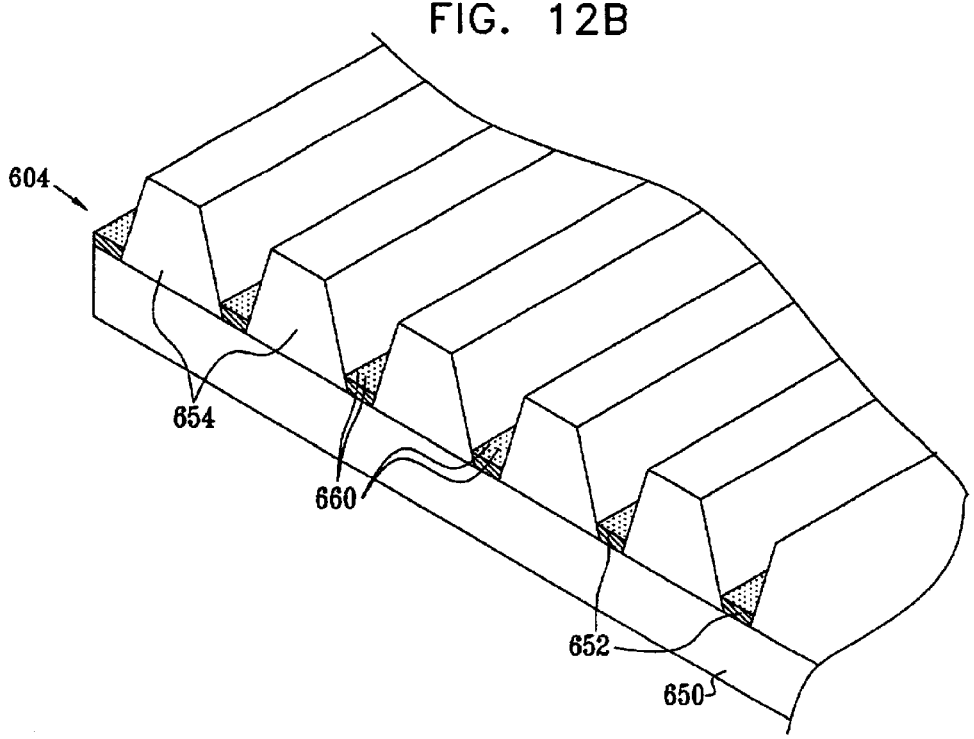

Reference is now made to FIGS. 12A and 12B which are respectively cross-sectional and pictorial illustrations of a portion of an image detection module 600, including an X-ray sensor 602 and a charge injection plate 604, constructed and operative in accordance with an alternative embodiment of the present invention.

X-ray sensor 602 preferably comprises a layered stack including, from bottom to top, a support substrate 610, a back electrode 612 formed over the support substrate 610, a photoelectric conversion multilayer 614 formed over back electrode 612 and a multilayer capacitor array 616 overlying the photoelectric conversion multilayer 614. Support substrate 610, back electrode 612, photoelectric conversion multilayer 614 and multilayer capacitor array 616 are preferably identical to corresponding elements described hereinabove with reference to X-ray sensor 60 (FIG. 2B).

Alternatively, support substrate 610, back electrode 612, photoelectric conversion multilayer 614 and multilayer capacitor array 616 may be identical to corresponding elements described hereinabove with reference to X-ray sensor 150 (FIG. 3).

It is a particular feature of this alternative embodiment of the present invention that charge injection plate 604, which uses an electronic addressing mechanism to individually address rows of multilayer capacitor array 616, is used instead of a mechanical addressing mechanism such as scanning elongate scanner 68 (FIG. 2B).

The advantage of an electronic addressing mechanism is that imaging, with a high frame rate, i.e. 30 frames per second, can be achieved. Thus, this alternative embodiment is suited for both static imaging applications such as general radiography and mammography, and also for dynamic imaging applications such as fluoroscopy and angiography. In addition, this embodiment, on a smaller scale and with a higher frame rate, may be implemented in computerized tomography (CT) applications.

Multilayer capacitor array 616 preferably includes a first conductive layer 620 patterned to form a matrix array of embedded microplates 622, a first dielectric layer 624, a second conductive layer 630 patterned to form a plurality of conductive strips 632, a second dielectric layer 634 and a third conductive layer 640 patterned to form a matrix array of exposed microplates 642.

Figure 13A:
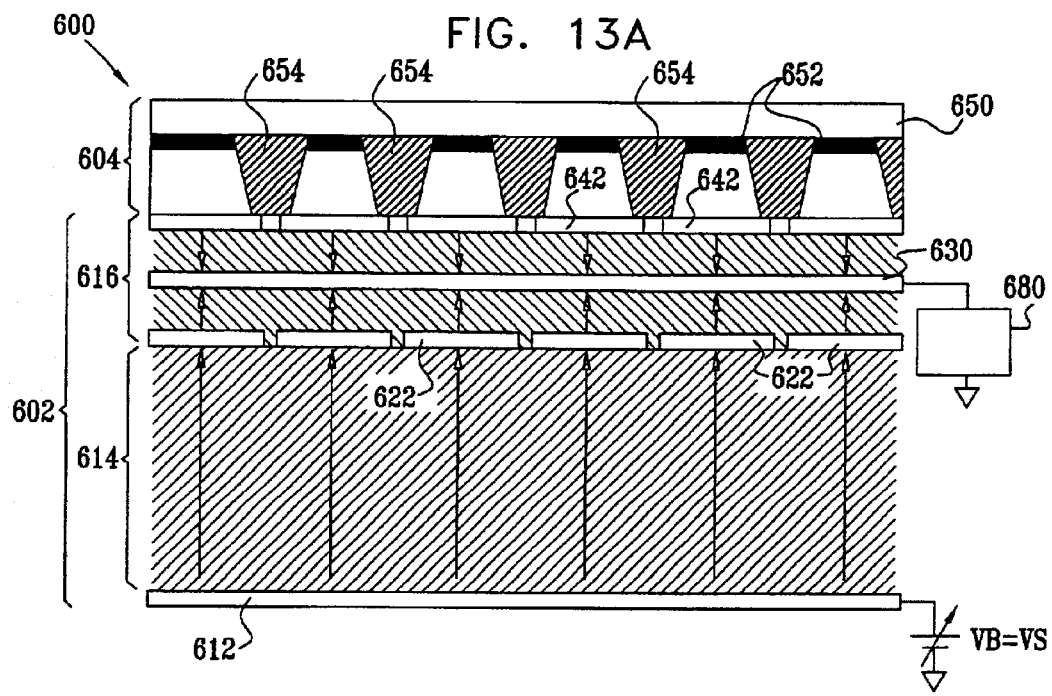
FIGS. 13A, 13B, and 13C are simplified illustrations useful in understanding the operation of the image detection module shown in FIGS. 12A–12B.
Figure 13B:
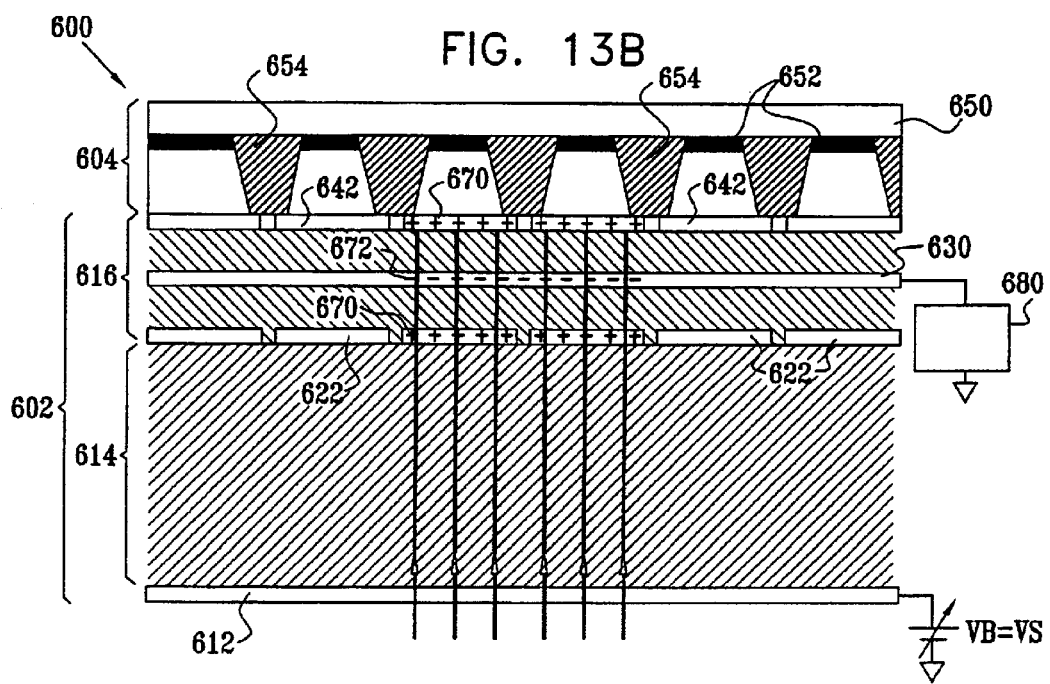
Figure 13C:
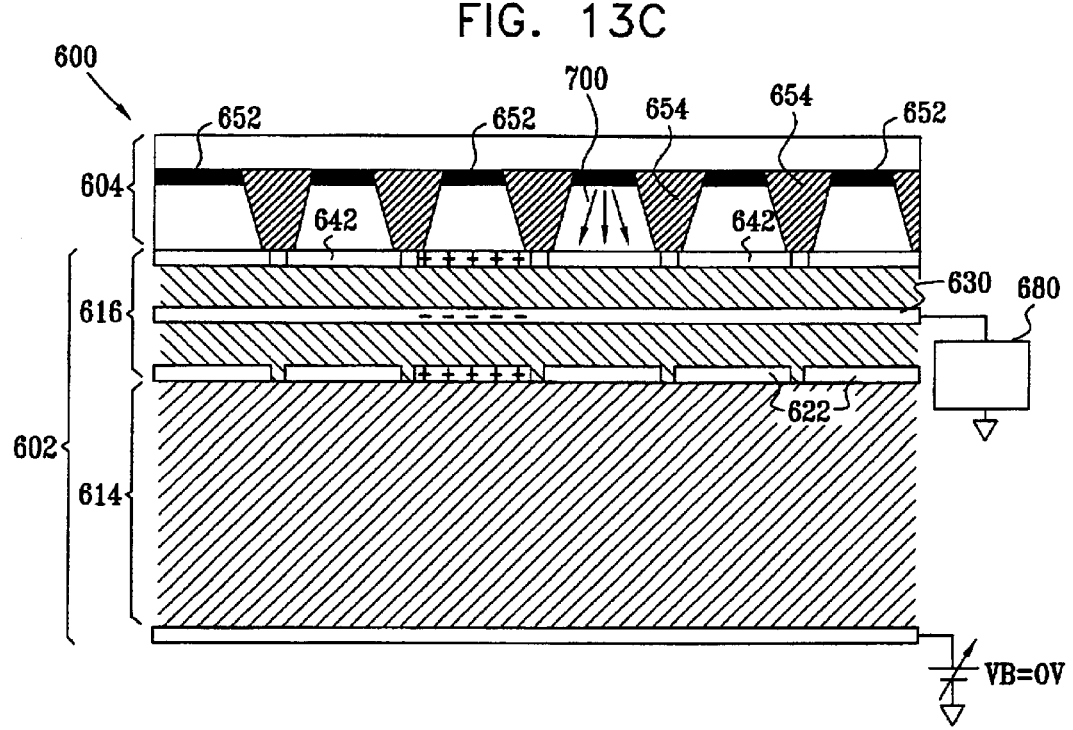

As shown in FIG. 12B, charge injection plate 604 preferably includes a back plate 650 and a plurality of elongate screen electrodes 652 separated by rows of elongate dielectric spacers 654. When charge injection plate 604 is located upstream of X-ray sensor 602, such that X-rays first impinge thereon, charge injection plate 604 is preferably permeable to X-ray radiation. Alternately, image detection module 600 may be inverted and operated with charge injection plate 604 downstream of X-ray sensor 602 as illustrated in FIGS. 13A, 13B and 13C. In the inverted embodiment, charge injection plate 604 is not required to be X-ray permeable.

Back plate 650 preferably comprises a plurality of charge generators (not shown) such as field emitters, photocathode emitters or other suitable electron emission mechanisms as known in the art. Preferably, the charge generators are arranged in an array of rows, with each row corresponding to a single elongate screen electrode 652. Each row of charge generators is individually addressable using electronic circuitry (not shown). When activated by the addressing mechanism, charge generators (not shown) emit electrons towards elongate screen electrodes 652.

Elongate screen electrodes 652 are preferably formed of metal having a plurality of perforations 660 (FIG. 12B) through which electrons, originating in back plate 650, are extracted during activation of the charge generators (not shown).

Elongate dielectric spacers 654 are typically formed from a dielectric material such as a polyimide, parylene or benzocyclobutene. Elongate dielectric spacers 654 create controlled spacing between the plane of elongate screen electrodes 652 and the top plane of multilayer capacitor array 616. Typically, the desired spacing is approximately ten times greater than the internal spacing between second conductive layer 630 and first conductive layer 620 of multilayer capacitor array 616. Thus, in the illustrated example of FIG. 12B the height of elongate dielectric spacers 654 is several tens of microns.

In addition to providing controlled spacing, elongate dielectric spacers 654 create elongate barriers which generally prevent the passage therethrough of electrons extracted through the perforations 660 (FIG. 12B) of the elongate screen electrodes 652. Thus, when a row of charge generators is activated, there is provided a flow of electrons towards multilayer capacitor array 616 generally only along an entire underlying row of exposed microplates 642.

It is appreciated that the number of elongate screen electrodes 652 preferably corresponds to the number of rows of exposed microplates 642 in multilayer capacitor array 616.

Charge injection plate 604 and X-ray sensor 602 are typically formed separately and then coupled together in spatial registration such that rows of elongate screen electrodes 652 are aligned with rows of exposed microplates 642. During the coupling, air is evacuated from the spaces between charge injection plate 604 and X-ray sensor 602, creating a vacuum therebetween. After attachment of the charge injection plate 604, X-ray detection module 600 is sealed along its perimeter to maintain the vacuum, using techniques well known in the art of flat panel displays. Maintaining a vacuum allows injection and transit of electrons therein.

Reference is now to made to FIGS. 13A, 13B and 13C which illustrate the operation of image detection module 600, constructed and operative in accordance with a preferred embodiment of the present invention.

It is appreciated that operation of X-ray detection module 600 is similar to the operation of X-ray detection module 50 as described hereinabove with reference to FIGS. 10A, 10B and 10C. However, it is appreciated that charge injection plate 604 injects only negative polarity charge. Accordingly, in this embodiment, a suitable voltage regime operates, employing voltages that are opposite in polarity to those described hereinabove with reference to X-ray detection module 50.

It is a particular feature of this alternative embodiment of the present invention that a positive bias potential VB is applied between back electrode 612 and second conductive layer 630 during sensitization of X-ray sensor 602, either as a ramp-up or as a constant over time which are analogous to the voltage regimes described hereinabove with reference to FIGS. 11A and 11B.

A VR of zero, i.e. ground potential, is preferably applied continuously to elongate screen electrodes 652 of charge injection plate 604.

This embodiment is further differentiated from the embodiment of FIGS. 10A, 10B and 10C above, inasmuch as voltage VB is positive and the arrangement of the charge blocking layers of photoelectric conversion multilayer 614 is interchanged. In this embodiment, the positive charge buffer (n-type blocking layer) is beneath the photoelectric conversion layer and the negative charge buffer (p-type blocking layer) overlies the photoelectric conversion layer and interfaces multilayer capacitor array 616.

An imaging cycle preferably begins with reset of X-ray sensor 602 by adjusting the bias voltage VB applied to back electrode 612 set to ground and sequentially activating rows of charge generators to provide an "electronic" sweep of the multilayer capacitor array 616. During the "electronic" sweep, reference voltage VR, applied to elongate screen electrodes 652, is coupled to ground.

When a row of charge generators (not shown) are activated, self-quenching charge extraction occurs through perforations 660 (FIG. 12B) causing a corresponding row of multilayer capacitor array 616 to be negatively charged, until a zero ASV is created thereat.

Following reset, the x-ray sensor 602 is prepared for X-ray exposure by ramping voltage VB to a positive value equal to sensitizing voltage VS. In FIG. 12A, X-ray sensor 602 is shown after reset and electrical sensitization, ready for exposure to X-ray radiation.

During exposure, as shown in FIG. 13B, a spatially modulated net charge pattern 670 of positive charges is collected and retained at embedded microplates 622 and exposed microplates 642 and a corresponding net counter charge pattern replica 672 is retained at second conductive layer 630. It is noted that the charge polarities are the opposite of those used with X-ray sensor 60 (FIG. 10B).

After exposure, VB is preferably ramped down to zero, and spatially modulated net charge pattern 670 is read out by sequential addressing and activation of rows of charge generators (not shown) of charge injection plate 604 as shown in FIG. 13C. As occurs during the electronic reset sweep, here also each activated row provides a self-quenching flow of electrons as indicated by reference arrows 700 from perforations 660 (FIG. 12B) of elongate screen electrodes 652 to a corresponding row of exposed microplates 642. The flow of electrons causes discharge of the exposed microplates 642 in the row until the ASVs thereat are equal to the voltage VR applied to screen electrodes 652, which is zero. The corresponding charge flow due to counter charge redistribution at second conductive layer 630 is measured by integrated readout electronics 680 to provide a digital representation of the X-ray image. Integrated readout electronics 680 may be as described hereinabove with particular reference to integrated readout electronics 64 (FIG. 2B).

It is appreciated that in accordance with one embodiment of the present invention, voltage VB is maintained at a constant level throughout the imaging cycle.

It will be appreciated by persons skilled in the art that the present invention is not limited by what has been described above. The scope of the present invention includes both combinations and sub-combinations of the various features described hereinabove as well as modifications and additions thereto which would occur to a person skilled in the art upon reading the foregoing disclosure and which are not in the prior art.

What is claimed is:

1. An ionizing radiation image sensor including:

an ionizing radiation sensitive element;

a generally pixellated array of capacitors cooperating with said ionizing radiation sensitive element; and a charge source which is operative to electrically charge the pixellated array of capacitors through a gap.

2. An ionizing radiation image sensor according to claim 1 and wherein each capacitor of said generally pixellated array includes an electrode having at least one conducting plate which is at least partially exposed for charge injection thereto.

3. An ionizing radiation image sensor including:

an ionizing radiation conversion multilayer element which is operative to convert impinging ionizing radiation to electrical charge;

an external charge source which is operative to emit electrical charge; and an array of storage capacitors disposed between said ionizing radiation conversion multilayer element and said external charge source, said storage capacitors being operative to sink charge to or source charge from said ionizing radiation conversion multilayer element and to sink charge to or source charge from said external charge source.

4. An ionizing radiation image sensor according to claim 3 and wherein said ionizing radiation conversion multilayer element is sensitive to X-ray.

5. An ionizing radiation image sensor according to claim 3 and wherein said ionizing radiation conversion multilayer element includes at least one layer which directly converts X-ray radiation to electrical charge.

6. An ionizing radiation image sensor according to claim 5 and wherein said at least one layer which directly converts X-ray radiation to electrical charge is formed from amorphous selenium doped with at least one of arsenic and chlorine.

7. An ionizing radiation image sensor according to claim 3 and wherein said ionizing radiation conversion multilayer element includes at least one layer which converts X-ray radiation to optical radiation.

8. An ionizing radiation image sensor according to claim 7 and wherein said at least one layer which converts X-ray radiation to optical radiation is formed from one of the following materials: cesium iodide doped with thallium and cesium iodide doped with sodium.

9. An ionizing radiation image readout device including:

an ionizing radiation sensitive element operative to convert impinging X-ray radiation to an electrical charge image; and a storage capacitor array operative to store said electrical charge image and including:

a matrix array of plate electrodes; and a linear array of elongate electrodes, wherein the storage capacitor array is addressed via said plate electrodes and a charge image readout is carried out via said elongate electrodes.

10. An ionizing radiation image readout device according to claim 9 and further including at least one charge source which addresses said storage capacitor array by charge injection in a row-by-row manner.

11. An ionizing radiation image readout device according to claim 10 wherein said row-by-row charge injection results in generally uniform charging of said matrix array of plate electrodes.

12. An ionizing radiation imager including:
- a first array of storage capacitors which is operative to store a charge pattern representing an ionizing radiation image at a first resolution;
- a second array of storage capacitors, capacitively coupled to said first array of storage capacitors, which is operative to store a charge pattern representing said ionizing radiation image at a second resolution;
- integrated radiation data readout electronics connected to said first array of storage capacitors; and
- real-time radiation data readout electronics connected to said second array of storage capacitors.

13. An ionizing radiation imager according to claim 12 wherein the first resolution is a generally high resolution and wherein the second resolution is a generally lower resolution.

14. An ionizing radiation imager according to claim 12 wherein said integrated radiation data readout electronics provides data representing an X-ray image and wherein said real-time radiation data provides feedback for automatic exposure control.

15. A method for ionizing radiation imaging and including:
- providing an ionizing radiation sensitive element including an array of storage capacitors coupled thereto;
- charging said array of storage capacitors to a generally uniform voltage level using a non-contact proximity charge source;
- exposing said ionizing radiation sensitive element to impinging ionizing radiation causing imagewise discharge of said charged array of storage capacitors thus creating an electrical charge pattern therein corresponding to an ionizing radiation image; and
- charging said array of storage capacitors to a generally uniform voltage level using a non-contact proximity charge source thereby causing readout of said an electrical charge pattern.

16. A method according to claim 15 and wherein said charging comprises charge injection to each capacitor of said array via at least one conducting plate which is at least partially exposed for charge injection thereto.

17. A method for ionizing radiation imaging including:
- providing an ionizing radiation conversion multilayer element which is operative to convert impinging ionizing radiation to electrical charge;
- causing an external charge source to emit electrical charge; and
- causing an array of storage capacitors disposed between said ionizing radiation conversion multilayer element and said external charge source to sink charge to or source charge from said ionizing radiation conversion multilayer element and to sink charge to or source charge from said external charge source.

18. A method according to claim 17 and wherein said ionizing radiation conversion multilayer element is sensitive to X-ray.

19. A method according to claim 17 and wherein said ionizing radiation conversion multilayer element includes at least one layer which directly converts X-ray radiation to electrical charge.

20. A method according to claim 17 and wherein said ionizing radiation conversion multilayer element includes at least one layer which converts X-ray radiation to optical radiation.

21. An ionizing radiation image readout method comprising:
- causing an ionizing radiation sensitive element to convert impinging X-ray radiation to an electrical charge image; and
- storing said electrical charge image on a storage capacitor array including a matrix array of plate electrodes and a linear array of elongate electrodes;
- addressing said storage capacitor array via said plate electrodes; and
- reading out said electrical charge image via said elongate electrodes.

22. A method for ionizing radiation imaging comprising:
- causing a first array of storage capacitors to store a charge pattern representing an ionizing radiation image at a first resolution;
- causing a second array of storage capacitors, capacitively coupled to said first array of storage capacitors, to store a charge pattern representing said ionizing radiation image at a second resolution;
- reading out real-time radiation image data from said second array of storage capacitors; and
- reading out integrated radiation image data from said first array of storage capacitors.

23. A method according to claim 22 and also comprising effecting real-time exposure control employing said real-time radiation image data.

* * * * *